United States Patent
Wen et al.

(10) Patent No.: US 12,484,060 B2
(45) Date of Patent: Nov. 25, 2025

(54) COMMUNICATION METHOD AND COMMUNICATIONS APPARATUS

(71) Applicant: HUAWEI TECHNOLOGIES CO., LTD., Guangdong (CN)

(72) Inventors: Ronghui Wen, Beijing (CN); Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 453 days.

(21) Appl. No.: 17/986,195

(22) Filed: Nov. 14, 2022

(65) Prior Publication Data

US 2023/0080127 A1 Mar. 16, 2023

Related U.S. Application Data

(63) Continuation of application No. PCT/CN2021/089246, filed on Apr. 23, 2021.

(30) Foreign Application Priority Data

May 15, 2020 (CN) .......................... 202010418043.7

(51) Int. Cl.
*H04W 72/20* (2023.01)
*H04W 72/51* (2023.01)

(52) U.S. Cl.
CPC ........... *H04W 72/20* (2023.01); *H04W 72/51* (2023.01)

(58) Field of Classification Search
CPC ..... H04W 72/20; H04W 72/51; H04W 72/23; H04W 72/0446; H04W 72/0453; H04L 5/001; H04L 5/0053
See application file for complete search history.

(56) References Cited

U.S. PATENT DOCUMENTS

2011/0045860 A1 2/2011 Nam et al.
2018/0227156 A1* 8/2018 Papasakellariou ... H04B 7/0456
(Continued)

FOREIGN PATENT DOCUMENTS

| CN | 104956752 A | 9/2015 |
|---|---|---|
| CN | 110419189 A | 11/2019 |
| CN | 111034305 A | 4/2020 |

OTHER PUBLICATIONS

RP-193238, Ericsson, New SID on support of reduced capability NR devices, 3GPP TSG RAN Meeting #86, Sitges, Spain, Dec. 9-12, 2019, 5 pages.

*Primary Examiner* — Ayaz R Sheikh
*Assistant Examiner* — Tarell A Hampton
(74) *Attorney, Agent, or Firm* — WOMBLE BOND DICKINSON (US) LLP

(57) ABSTRACT

Embodiments of this application disclose a communication method and a communications apparatus, to be used by a terminal device to monitor a control channel on a corresponding resource, to implement communication between a network device and a terminal device of this type. A first terminal device monitors a first control channel on M REGbundles in W REGbundles or on M CCE resources corresponding to the M REGbundles. In this solution, a network device can configure a control channel resource for the first terminal device and a second terminal device, and the first terminal device and the second terminal device belong to different types of terminal devices, so that communication reliability of the first terminal device can be ensured without affecting a communication resource of the second terminal device.

20 Claims, 20 Drawing Sheets

(56) References Cited

U.S. PATENT DOCUMENTS

| | | | | |
|---|---|---|---|---|
| 2018/0287761 A1* | 10/2018 | You | .................. | H04L 5/0053 |
| 2019/0069276 A1* | 2/2019 | Kwak | .................. | H04L 1/0071 |
| 2019/0141546 A1* | 5/2019 | Zhou | .................. | H04L 5/001 |
| 2019/0230685 A1* | 7/2019 | Park | .................. | H04L 1/1854 |
| 2019/0253308 A1* | 8/2019 | Huang | .................. | H04L 43/0823 |
| 2020/0021419 A1* | 1/2020 | Taherzadeh Boroujeni | ................ H04L 5/0053 | |
| 2020/0092855 A1* | 3/2020 | Seo | .................. | H04L 5/0094 |
| 2020/0092866 A1* | 3/2020 | Xue | .................. | H04W 72/04 |
| 2020/0351924 A1* | 11/2020 | Seo | .................. | H04L 5/0053 |
| 2021/0028979 A1* | 1/2021 | Takeda | .................. | H04W 72/23 |
| 2022/0132341 A1* | 4/2022 | Lee | .................. | H04W 72/1263 |
| 2022/0279563 A1* | 9/2022 | Wei | .................. | H04L 1/0071 |
| 2023/0156719 A1* | 5/2023 | Mozaffari | .......... | H04W 72/1263 370/329 |
| 2023/0179357 A1* | 6/2023 | Seo | .................. | H04L 1/00 370/329 |
| 2023/0299924 A1* | 9/2023 | Mozaffari | ............. | H04L 5/0053 370/329 |
| 2025/0096989 A1* | 3/2025 | Taherzadeh Boroujeni | ................ H04L 5/0007 | |

\* cited by examiner

REGbundle index 0 1 2 3 4 5 6 7 8 9 10 11 12 13 14 15 16 17 18 19 20 21 22 23 24 25 26 27 28 29 30 31 ncell=0

CCE index  0 2 4 6 8 10 12 14 16 18 20 22 24 26 28 30 1 3 5 7 9 11 13 15 17 19 21 23 25 27 29 31

REGbundle index 0 1 2 3 4 5 6 7 8 9 10 11 12 13 14 15 ncell=0

CCE index  0 2 4 6 8 10 12 14 1 3 5 7 9 11 13 15

REGbundle index 0 1 2 3 4 5 6 7 8 9 10 11 12 13 14 15 ncell=0

CCE index  0 2 4 6 8 10 12 14 1 3 5 7 9 11 13 15

FIG. 2y

COMMUNICATION METHOD AND COMMUNICATIONS APPARATUS

CROSS-REFERENCE TO RELATED APPLICATIONS

This application is a continuation of International Application No. PCT/CN2021/089246, filed on Apr. 23, 2021, which claims priority to Chinese Patent Application No. 202010418043.7, filed on May 15, 2020. The disclosures of the aforementioned applications are hereby incorporated by reference in their entireties.

TECHNICAL FIELD

This application relates to the communications field, and in particular, to a communication method and a communications apparatus.

BACKGROUND

To cope with explosive growth of mobile data traffic, device connections of massive mobile communications, and various new services and application scenarios constantly emerging in the future, the fifth generation (5G) mobile communications system emerges as the times require. For example, three types of application scenarios are defined in the 5G mobile communications system: an enhanced mobile broadband (eMBB) scenario, an ultra reliable and low latency communications (URLLC) scenario, and a massive machine type communications (mMTC) scenario.

For example, eMBB scenarios include an ultra-high definition video, augmented reality (AR), virtual reality (VR), and the like. Main characteristics of these services are a large amount of data to be transmitted and a high transmission rate. URLLC scenarios include wireless control in an industrial manufacturing or production process, motion control of unmanned autonomous vehicles and unmanned aerial vehicles, and tactile interactive applications such as remote repair and remote surgery. Main characteristics of these services are requirements for ultra-high reliability and low latency of transmission, a small amount of data to be transmitted, and burstiness. mMTC scenarios include power distribution automation for smart grids, communication for wearable devices, smart cities, and the like. Main characteristics of these services are a huge quantity of networked devices and a small amount of data to be transmitted. A terminal device in the mMTC scenario needs to meet requirements of low costs and a relatively long standby time.

In the foregoing different types of application scenarios, requirements of a terminal device for the mobile communications system are also different, for example, a reduced capability (REDCAP) terminal device in the mMTC scenario. With a growing demand for communication diversification, there is an urgent need for a method for a REDCAP terminal device to receive a control channel.

SUMMARY

Embodiments of this application provide a communication method and a communications apparatus, to be used by a terminal device to monitor a control channel on a corresponding resource, to implement communication between a network device and a terminal device of this type.

To resolve the foregoing technical problem, embodiments of this application provide the following technical solutions.

According to a first aspect, an embodiment of this application provides a communication method, including: A first terminal device receives first information from a network device, where the first information is used to indicate a first control resource set, a quantity of resource blocks of the first control resource set is N, a quantity of resource element group bundles REGbundles of the first control resource set is W, and bandwidth supported by the first terminal device is less than bandwidth corresponding to the N resource blocks, and N and W are positive integers; the first terminal device monitors a first control channel on M REGbundles in the W REGbundles, where M is less than W, indexes $\{i, i+1, \ldots, i+(Y-1)\}$ of Y REGbundles in the M REGbundles are consecutive, indexes $\{i+(Y+X), i+(Y+X+1), \ldots, i+(M-1+X)\}$ of remaining (M−Y) REGbundles in the M REGbundles are consecutive, M represents a quantity of available REGbundles of the first terminal device, i, Y, and X are values determined by the first terminal device, M and Y are positive integers, and i and X are integers greater than or equal to 0; or, the first terminal device monitors the first control channel on M control channel element CCE resources corresponding to the M REGbundles in the W REGbundles, where M is less than W, indexes of Y CCE resources in the M CCE resources are $\{C1, C1+2, \ldots, C1+(Y-1)\times2\}$, and indexes of remaining (M−Y) CCE resources in the M CCE resources are $\{C2, C2+2, \ldots, C2+(M-Y-1)\times2\}$; or, indexes of the M CCE resources in the M CCE resources are $\{C1, C1+2, \ldots, C1+(M-1)\times2\}$; M represents the quantity of the available REGbundles of the first terminal device, C1, C2, Y, and X are values determined by the first terminal device, M and Y are positive integers, and C1 and C2 are integers greater than or equal to 0. In this embodiment of this application, the first terminal device monitors the first control channel on the M REGbundles in the W REGbundles or on the M CCE resources corresponding to the M REGbundles. In this solution, the network device can send the control channel to the first terminal device, and the first terminal device is different from a second terminal device, so that requirements of different types of terminal devices for the control channel can be met. For example, the first terminal device and the second terminal device share the first control resource set, so that communication reliability of the first terminal device can be ensured when it is ensured that an optional resource of the second terminal device is affected to the minimum extent.

According to a second aspect, an embodiment of this application further provides a communication method, including: A network device sends first information to a first terminal device, where the first information is used to indicate a first control resource set, a quantity of resource blocks of the first control resource set is N, a quantity of resource element group bundles REGbundles of the first control resource set is W, and bandwidth supported by the first terminal device is less than bandwidth corresponding to the N resource blocks, and N and W are positive integers; the network device sends a first control channel on M REGbundles in the W REGbundles, where M is less than W, indexes $\{i, i+1, \ldots, i+(Y-1)\}$ of Y REGbundles in the M REGbundles are consecutive, indexes $\{i+(Y+X), i+(Y+X+1), \ldots, i+(M-1+X)\}$ of remaining (M−Y) REGbundles in the M REGbundles are consecutive, M represents a quantity of available REGbundles of the first terminal device, i, Y, and X are values determined by the first terminal device, M and Y are positive integers, and i and X are integers greater than or equal to 0; or, the network device sends the first control channel on M control channel element CCE resources corresponding to the M REGbundles in the W REGbundles, where M is less than W, indexes of Y CCE resources in the M CCE resources are {C1, C1+2, ..., C1+(Y−1)×2}, and indexes of remaining (M−Y) CCE resources in the M CCE resources are {C2, C2+2, ..., C2+(M−Y−1)×2}; or, indexes of the M CCE resources in the M CCE resources are {C1, C1+2, ..., C1+(M−1)×2}; M represents the quantity of the available REGbundles of the first terminal device, C1, C2, Y, and X are values determined by the first terminal device, M and Y are positive integers, and C1 and C2 are integers greater than or equal to 0. In this embodiment of this application, the first terminal device monitors the first control channel on the M REGbundles in the W REGbundles or on the M CCE resources corresponding to the M REGbundles. In this solution, the network device can send the control channel to the first terminal device, and the first terminal device is different from a second terminal device, so that requirements of different types of terminal devices for the control channel can be met. For example, the first terminal device and the second terminal device share the first control resource set, so that reliability of the first terminal device can be ensured when it is ensured that an optional resource of the second terminal device is affected to the minimum extent.

In an embodiment, i is determined based on one or more of the bandwidth supported by the first terminal device, a quantity l of symbols included in the first control resource set, N, W, a subcarrier spacing, a frequency range, a cell identifier, a radio frame number, a subframe number, and a slot number; and/or, Y is determined based on one or more of the bandwidth supported by the first terminal device, the quantity l of symbols, N, W, the subcarrier spacing, the frequency range, the cell identifier, the radio frame number, the subframe number, and the slot number; and/or, X is determined based on one or more of the bandwidth supported by the first terminal device, the quantity l of symbols, N, W, the subcarrier spacing, the frequency range, the cell identifier, the radio frame number, the subframe number, and the slot number; and/or, C1 is determined based on one or more of the bandwidth supported by the first terminal device, the quantity l of symbols, N, W, the subcarrier spacing, the frequency range, the cell identifier, the radio frame number, the subframe number, and the slot number; and/or, C2 is determined based on one or more of the bandwidth supported by the first terminal device, the quantity l of symbols, N, W, the subcarrier spacing, the frequency range, the cell identifier, the radio frame number, the subframe number, and the slot number.

In an embodiment, $i=\{n+Z\} \bmod (W/2)$, where n represents an identifier of a cell in which the first terminal device is located, $Z=W/2-2^{l-u}$, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter; and/or, $X=W/2-2^{l-u+1}$, where l represents the quantity of symbols included in the first control resource set, and u is the subcarrier spacing parameter; and/or, $X=[W/2-2^{l-u+1}]/2$, where l represents the quantity of symbols included in the first control resource set, and u is the subcarrier spacing parameter; and/or, $X=W/2-2^{l-1}$, where l represents the quantity of symbols included in the first control resource set, and u is the subcarrier spacing parameter. In the foregoing solution, for different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

In an embodiment, $C1=2N1+T$, where $N1=W/2-2^{l-u}$; when a result obtained through n mod W is greater than or equal to $2^{l-u}$ and less than or equal to $2^{l-u}+W/2-1$, $T=1$; when the result obtained through n mod W is less than $2^{l-u}$ or greater than $2^{l-u}+W/2-1$, $T=0$, where N represents an identifier of a cell in which the first terminal device is located, l represents the quantity of symbols included in the first control resource set, u is a subcarrier spacing parameter, and mod represents a REM operation; and/or, $C2=2N2+1-T$, where $N2=W/2-2^{l-u+1}$, or $N2=(W/2-2^{l-u+1}/2$; when the result obtained through n mod W is greater than or equal to $2^{l-u}$ and less than or equal to $2^{l-u}+W/2-1$}, $T=1$; when the result obtained through n mod W is less than $2^{l-u}$ or greater than $2^{l-u}+W/2-1$, $T=0$, where n represents the identifier of the cell in which the first terminal device is located, l represents the quantity of symbols included in the first control resource set, and u is the subcarrier spacing parameter; and/or, $Y=M/2$, or $Y=2^{l-u}$, where l represents the quantity of symbols included in the first control resource set, and u is the subcarrier spacing parameter. In the foregoing solution, for different quantities l of symbols and different quantities N of resource blocks of the first control resource set, and different bandwidth ranges supported by the first terminal device, values of C1, C2, and Y have a plurality of cases. After C1, C2, and Y are determined, CCE resources that can be used by the first terminal device can be determined, so that the first terminal device can monitor the control channel.

In an embodiment, $i=n \bmod (W/2)+Z$, where n represents an identifier of a cell in which the first terminal device is located, $Z=W/2-2^{l-u+1}$, or $Z=[W/2-2^{l-u+1}]/2$, where l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter; and/or, $X=0$. In the foregoing solution, for different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

In an embodiment, $C1=2N1+T$, where $N1=W/2-2^{l-u+1}$, or $N1=[W/2-2^{l-u+1}]/2$; when a result obtained through n mod W is greater than or equal to 0 and less than or equal to $W/2-1$, $T=0$; when the result obtained through n mod W is greater than $W/2-1$, $T=1$, where n represents an identifier of a cell in which the first terminal device is located, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter. In the foregoing solution, for different quantities l of symbols and different quantities N of resource blocks of the first control resource set, and different bandwidth ranges supported by the first terminal device, values of C1, C2, and Y have a plurality of cases. After C1, C2, and Y are determined, CCE resources that can be used by the first terminal device can be determined, so that the first terminal device can monitor the control channel.

In an embodiment, the monitoring a first control channel includes: monitoring the first control channel in a first resource subset or a second resource set, where i, Y, and X in the first resource subset satisfy the following feature: When a result obtained through n mod W/2 is greater than or equal to 1 and less than or equal to $2^{l+1}$, i=0, where Y=n mod W/2, and X=Z; when the result obtained through n mod W/2 is less than 1 or greater than or equal to $2^{l+1}$, i=(n+Z) mod W/2, and X=0, where Z=W/2−$2^{l−u+1}$, or Z=[W/2−$2^{l−u+1}$]/2, n represents an identifier of a cell in which the first terminal device is located, l represents the quantity of symbols included in the first control resource set, u is a subcarrier spacing parameter, and mod represents a REM operation; and/or, i, Y, and X in the second resource subset satisfy the following feature: When the result obtained through n mod W/2 is greater than or equal to 1 and less than or equal to $2^{l+1}$, i=W/2, Y=n mod W/2, and X=Z; when the result obtained through n mod W/2 is less than 1 or greater than or equal to $2^{l+1}$, i=(n+Z) mod W/2+W/2, and X=0, where Z=W/2−$2^{l−u+1}$ or Z=[W/2−$2^{l−u+1}$]/2, n represents the identifier of the cell in which the first terminal device is located, l represents the quantity of symbols included in the first control resource set, u is the subcarrier spacing parameter, and mod represents the REM operation. In the foregoing solution, for different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

In an embodiment, the monitoring a first control channel includes: monitoring the first control channel in a first resource subset or a second resource set, where i, Y, and X in the first resource subset satisfy the following feature: When a result obtained through n mod W is greater than or equal to 1 and less than or equal to N, C1=W+1−(n mod W)×2, Y=n mod $2^{l+1}$, and C2=Z; when the result obtained through n mod W is greater than or equal to 1+W/2 and less than or equal to N+W/2, C1=W−(n mod W)×2, Y=n mod $2^{l+1}$, C2=Z+1, and N2=n mod W/2; when the result obtained through n mod W is greater than or equal to N+1 and less than or equal to W/2, C1=Z+1; when the result obtained through n mod W is less than 1 or greater than N+W/2, C1=Z, where N=$2^{l+1}$, Z=W/2−$2^{l−u+1}$ or Z=[W/2−$2^{l−u+1}$]/2, n represents an identifier of a cell in which the first terminal device is located, l represents the quantity of symbols included in the first control resource set, u is a subcarrier spacing parameter, and mod represents a REM operation; and/or, i, Y, and X in the second resource subset satisfy the following feature: When the result obtained through n mod W is greater than or equal to 1 and less than or equal to N, C1=W−(N mod W)×2, Y=n mod $2^{l+1}$, and C2=Z+1; when the result obtained through n mod W is greater than or equal to 1+W/2 and less than or equal to N+W/2, C1=W+1−(n mod W)×2, Y=n mod $2^{l+1}$, C2=Z, and N2=n mod W/2; when n mod W is greater than or equal to N+1 and less than or equal to W/2, C1=Z; when n mod W is greater than or equal to 1 and less than or equal to N+W/2, C1=Z+1, where N=$2^{l+1}$, Z=W/2−$2^{l−u+1}$, or Z=[W/2−$2^{l−u+1}$]/2, n represents the identifier of the cell in which the first terminal device is located, l represents the quantity of symbols included in the first control resource set, u is the subcarrier spacing parameter, and mod represents the REM operation. In the foregoing solution, for different quantities l of symbols and different quantities N of resource blocks of the first control resource set, and different bandwidth ranges supported by the first terminal device, values of C1, C2, and Y have a plurality of cases. After C1, C2, and Y are determined, CCE resources that can be used by the first terminal device can be determined, so that the first terminal device can monitor the control channel.

In an embodiment, the monitoring a first control channel in a first resource subset or a second resource set includes: monitoring the first control channel on a resource of the first resource subset in a first time unit and monitoring the first control channel on a resource of the second resource subset in a second time unit. The first time unit and the second time unit are different time units, so that the first terminal device can perform frequency hopping in different time units. Therefore, whether the first terminal device supports frequency hopping is determined in a CORESET resource mapping manner that supports frequency hopping, to be specific, resources are mapped to logical consecutive resources in a high frequency band or a low frequency band, and is determined according to a signaling indication or a rule.

In an embodiment, the method further includes: Before receiving the first information, the first terminal device receives second information, where the second information indicates the first terminal device to monitor the first control channel on a resource of the first control resource set, or monitor the first control channel on a resource set not overlapping the first control resource set. The second information can indicate the first terminal device to monitor the first control channel on the resource of the first control resource set, or monitor the first control channel on the resource set not overlapping the first control resource set. If the first terminal device monitors the first control channel on the resource set not overlapping the first control resource set, the first terminal device can avoid a conflict with the first control resource set used by the second terminal device, so that a resource conflict problem existing when the first terminal device and the second terminal device coexist is resolved.

According to a third aspect, an embodiment of this application further provides a communications apparatus, where the communications apparatus is a first communications apparatus, and the first communications apparatus includes: a transceiver module, configured to receive first information from a second communications apparatus, where the first information is used to indicate a first control resource set, a quantity of resource blocks of the first control resource set is N, a quantity of resource element group bundles REGbundles of the first control resource set is W, and bandwidth supported by the first communications apparatus is less than bandwidth corresponding to the N resource blocks, and N and W are positive integers; and a processing module, configured to monitor a first control channel on M REGbundles in the W REGbundles, where M is less than W, indexes {i, i+1, . . . , i+(Y−1)} of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first communications apparatus, i, Y, and X are values determined by the first communications apparatus, M and Y are positive integers, and i and X are integers greater than or equal to 0; or, the processing module is configured to monitor the first control channel on M control channel element CCE resources corresponding to the M REGbundles in the W REGbundles, where M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or, indexes of the M CCE resources are {C1, C1+2, . . . , C1+(M−1)×2}; M represents the quantity of the available REGbundles of the first communications apparatus, C1, C2, Y, and X are values determined by the first communications apparatus, M and Y are positive integers, and C1 and C2 are integers greater than or equal to 0.

In the third aspect of this application, the composition modules of the communications apparatus may further perform the operations described in the first aspect and the possible implementations. For details, refer to the descriptions in the first aspect and the possible implementations.

According to a fourth aspect, an embodiment of this application further provides a communications apparatus, where the communications apparatus includes a second communications apparatus, and the second communications apparatus includes: a processing module, configured to send first information to a first communications apparatus by using a transceiver module, where the first information is used to indicate a first control resource set, a quantity of resource blocks of the first control resource set is N, a quantity of resource element group bundles REGbundles of the first control resource set is W, and bandwidth supported by the first communications apparatus is less than bandwidth corresponding to the N resource blocks, and N and W are positive integers; the processing module is configured to send a first control channel on M REGbundles in the W REGbundles by using the transceiver module, where M is less than W, indexes {i, i+1, . . . , i+(Y−1)} of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first communications apparatus, i, Y, and X are values determined by the first communications apparatus, M and Y are positive integers, and i and X are integers greater than or equal to 0; or, the processing module is configured to send the first control channel on M control channel element CCE resources corresponding to the M REGbundles in the W REGbundles by using the transceiver module, where M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or, indexes of the M CCE resources in the M CCE resources are {C1, C1+2, . . . , C1+(M−1)×2}; M represents the quantity of the available REGbundles of the first communications apparatus, C1, C2, Y, and X are values determined by the first communications apparatus, M and Y are positive integers, and C1 and C2 are integers greater than or equal to 0.

In the fourth aspect of this application, the composition modules of the communications apparatus may further perform the operations described in the second aspect and the possible implementations. For details, refer to the descriptions of the second aspect and the possible implementations.

In an embodiment, i is determined based on one or more of the bandwidth supported by the first communications apparatus, a quantity l of symbols included in the first control resource set, N, W, a subcarrier spacing, a frequency range, a cell identifier, a radio frame number, a subframe number, and a slot number; and/or, Y is determined based on one or more of the bandwidth supported by the first communications apparatus, the quantity l of symbols, N, W, the subcarrier spacing, the frequency range, the cell identifier, the radio frame number, the subframe number, and the slot number; and/or, X is determined based on one or more of the bandwidth supported by the first communications apparatus, the quantity l of symbols, N, W, the subcarrier spacing, the frequency range, the cell identifier, the radio frame number, the subframe number, and the slot number; and/or, C1 is determined based on one or more of the bandwidth supported by the first communications apparatus, the quantity l of symbols, N, W, the subcarrier spacing, the frequency range, the cell identifier, the radio frame number, the subframe number, and the slot number; and/or, C2 is determined based on one or more of the bandwidth supported by the first communications apparatus, the quantity l of symbols, N, W, the subcarrier spacing, the frequency range, the cell identifier, the radio frame number, the subframe number, and the slot number.

In an embodiment, i={n+Z} mod (W/2), where n represents an identifier of a cell in which the first communications apparatus is located, $Z=W/2-2^{l-u}$, l represents the quantity of symbols included in the first control resource set, u is a subcarrier spacing parameter, and mod represents a REM operation; and/or, Y=M/2, or $Y=2^{l-u}$, where l represents the quantity of symbols included in the first control resource set, and u is the subcarrier spacing parameter; and/or, $X=W/2-2^{l-u+1}$, where l represents the quantity of symbols included in the first control resource set, and u is the subcarrier spacing parameter; and/or, $X=[W/2-2^{l-u+1}]/2$, where l represents the quantity of symbols included in the first control resource set, and u is the subcarrier spacing parameter; and/or, $X=W/2-2^{l-1}$, where l represents the quantity of symbols included in the first control resource set, and u is the subcarrier spacing parameter.

In an embodiment, C1=2N1+T, where $N1=W/2-2^{l-u}$; when a result obtained through n mod W is greater than or equal to $2^{l-u}$ and less than or equal to $2^{l-u}+W/2-1$, T=1; when the result obtained through n mod W is less than $2^{l-u}$ or greater than $2^{l-u}+W/2-1$, T=0, where N represents an identifier of a cell in which the first communications apparatus is located, l represents the quantity of symbols included in the first control resource set, u is a subcarrier spacing parameter, and mod represents a REM operation; and/or, C2=2N2+1−T, where $N2=W/2-2^{l-u+1}$, or $N2=(W/2-2^{l-u+1}/2$; when the result obtained through n mod W is greater than or equal to $2^{l-u}$ and less than or equal to $2^{l-u}+W/2-1$}, T=1; when the result obtained through n mod W is less than $2^{l-u}$ or greater than $2^{l-u}+W/2-1$, T=0, where n represents the identifier of the cell in which the first communications apparatus is located, l represents the quantity of symbols included in the first control resource set, and u is the subcarrier spacing parameter; and/or, Y=M/2, or $Y=2^{l-u}$, where l represents the quantity of symbols included in the first control resource set, and u is the subcarrier spacing parameter.

In an embodiment, i=n mod (W/2)+Z, where n represents an identifier of a cell in which the first communications apparatus is located, $Z=W/2-2^{l-u+1}$, or $Z=[W/2-2^{l-u+1}]/2$, l represents the quantity of symbols included in the first control resource set, u is a subcarrier spacing parameter, and mod represents a REM operation; and/or, Y=M/2, or $Y=2^{l-u}$, where l represents the quantity of symbols included in the first control resource set, and u is the subcarrier spacing parameter; and/or, X=0.

In an embodiment, C1=2N1+T, where $N1=W/2-2^{l-u+1}$, or $N1=[W/2-2^{l-u+1}]/2$; when a result obtained through n mod W is greater than or equal to 0 and less than or equal to W/2−1, T=0; when the result obtained through n mod W is greater than W/2−1, T=1, where n represents an identifier of a cell in which the first communications apparatus is located, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter.

In an embodiment, the processing module is configured to monitor the first control channel in a first resource subset or a second resource set, where i, Y, and X in the first resource subset satisfy the following feature: When a result obtained through n mod W/2 is greater than or equal to 1 and less than or equal to $2^{l+1}$, i=0, where Y=n mod W/2, and X=Z; when the result obtained through n mod W/2 is less than 1 or greater than or equal to $2^{l+1}$, i=(n+Z) mod W/2, and X=0, where $Z=W/2-2^{l-u+1}$, or $Z=[W/2-2^{l-u+1}]/2$, n represents an identifier of a cell in which the first communications apparatus is located, l represents the quantity of symbols included in the first control resource set, u is a subcarrier spacing parameter, and mod represents a REM operation; and/or, i, Y, and X in the second resource subset satisfy the following feature: When the result obtained through n mod W/2 is greater than or equal to 1 and less than or equal to $2^{l+1}$, i=W/2, Y=n mod W/2, and X=Z; when the result obtained through n mod W/2 is less than 1 or greater than or equal to $2^{l+1}$, i=(n+Z) mod W/2+W/2, and X=0, where $Z=W/2-2^{l-u+1}$ or $Z=[W/2-2^{l-u+1}]/2$, n represents the identifier of the cell in which the first communications apparatus is located, l represents the quantity of symbols included in the first control resource set, u is the subcarrier spacing parameter, and mod represents the REM operation.

In an embodiment, the processing module is configured to monitor the first control channel in a first resource subset or a second resource set, where i, Y, and X in the first resource subset satisfy the following feature: When a result obtained through n mod W is greater than or equal to 1 and less than or equal to N, $C1=W+1-(n \bmod W)\times 2$, $Y=n \bmod 2^{l+1}$, and C2=Z; when the result obtained through n mod W is greater than or equal to 1+W/2 and less than or equal to N+W/2, $C1=W-(n \bmod W)\times 2$, $Y=n \bmod 2^{l+1}$, C2=Z+1, and N2=n mod W/2; when the result obtained through n mod W is greater than or equal to N+1 and less than or equal to W/2, C1=Z+1; when the result obtained through n mod W is less than 1 or greater than N+W/2, C1=Z, where $N=2^{l+1}$, $Z=W/2-2^{l-u+1}$ or $Z=[W/2-2^{l-u+1}]/2$, n represents an identifier of a cell in which the first communications apparatus is located, l represents the quantity of symbols included in the first control resource set, u is a subcarrier spacing parameter, and mod represents a REM operation; and/or, i, Y, and X in the second resource subset satisfy the following feature: When the result obtained through n mod W is greater than or equal to 1 and less than or equal to N, $C1=W-(N \bmod W)\times 2$, $Y=n \bmod 2^{l+1}$, and C2=Z+1; when the result obtained through n mod W is greater than or equal to 1+W/2 and less than or equal to N+W/2, $C1=W+1-(n \bmod W)\times 2$, $Y=n \bmod 2^{l+1}$, C2=Z, and N2=n mod W/2; when n mod W is greater than or equal to N+1 and less than or equal to W/2, C1=Z; when n mod W is greater than or equal to 1 and less than or equal to N+W/2, C1=Z+1, where $N=2^{l+1}$, $Z=W/2-2^{l-u+1}$, or $Z=[W/2-2^{l-u+1}]/2$, n represents the identifier of the cell in which the first communications apparatus is located, l represents the quantity of symbols included in the first control resource set, u is the subcarrier spacing parameter, and mod represents the REM operation.

In an embodiment, the processing module is configured to: monitor the first control channel on a resource of the first resource subset in a first time unit and monitor the first control channel on a resource of the second resource subset in a second time unit.

In an embodiment, the processing module is configured to: before receiving the first information, receive second information by using the transceiver module, where the second information indicates the first communications apparatus to monitor the first control channel on a resource of the first control resource set, or monitor the first control channel on a resource set not overlapping the first control resource set.

According to a fifth aspect, an apparatus is provided. The apparatus may be a terminal device, or an apparatus in the terminal device, or an apparatus that can be used in cooperation with the terminal device. In a design, the apparatus may include a one-to-one corresponding module that performs the method/operation/operation/action described in the first aspect. The module may be a hardware circuit, or software, or may be implemented by a hardware circuit in combination with software. In a design, the apparatus may include a processing module and a transceiver module.

According to a sixth aspect, an apparatus is provided. The apparatus may be a network device, or an apparatus in a network device, or an apparatus that can be used in cooperation with the network device. In a design, the apparatus may include a one-to-one corresponding module that performs the method/operation/operation/action described in the second aspect. The module may be a hardware circuit, or software, or may be implemented by a hardware circuit in combination with software. In a design, the apparatus may include a processing module and a transceiver module.

According to a seventh aspect, an embodiment of this application provides an apparatus. The apparatus includes a processor and a communications interface, and is configured to implement the method described in the first aspect. Optionally, the apparatus may further include a memory, configured to store instructions and data. The memory is coupled to the processor, and when the processor executes the instructions stored in the memory, the method described in the first aspect can be implemented. The apparatus may further include a communications interface. The communications interface is used by the apparatus to communicate with another device. For example, the communications interface may be a transceiver, a circuit, a bus, a module, a pin, or another type of communications interface, and the another device may be a network device. In a possible device, the apparatus includes:

a memory, configured to store program instructions; and
a processor, configured to perform the operations in the first aspect by using the communications interface. This is not specifically limited herein again.

According to an eighth aspect, an embodiment of this application provides an apparatus. The apparatus includes a processor and a communications interface, and is configured to implement the method described in the second aspect. Optionally, the apparatus may further include a memory, configured to store instructions and data. The memory is coupled to the processor, and when the processor executes the instructions stored in the memory, the method described in the second aspect can be implemented. The apparatus may further include a communications interface. The communications interface is used by the apparatus to communicate with another device. For example, the communications interface may be a transceiver, a circuit, a bus, a module, a pin, or another type of communications interface, and the another device may be a terminal device. In a possible device, the apparatus includes:

a memory, configured to store program instructions; and
a processor, configured to perform the operations in the second aspect by using the communications interface.

This is not specifically limited herein again.

According to a ninth aspect, an embodiment of this application further provides a computer-readable storage medium, including instructions. When the instructions are run on a computer, the computer is enabled to perform the method according to any one of the first aspect and the second aspect.

According to a tenth aspect, an embodiment of this application further provides a computer program product, including instructions. When the computer program product runs on a computer, the computer is enabled to perform the method according to any one of the first aspect and the second aspect.

According to an eleventh aspect, an embodiment of this application provides a chip system. The chip system includes a processor and a communications interface, and may further include a memory, configured to implement the method according to any one of the first aspect and the second aspect. The chip system may include a chip, or include a chip and another discrete device.

According to a twelfth aspect, an embodiment of this application provides a communications system, where the communications system includes the apparatus in the first aspect and the apparatus in the second aspect.

BRIEF DESCRIPTION OF DRAWINGS

FIG. 2*za* and FIG. 2*zb* are schematic diagrams of a candidate control channel according to an embodiment of this application;

DESCRIPTION OF EMBODIMENTS

Figure 1:
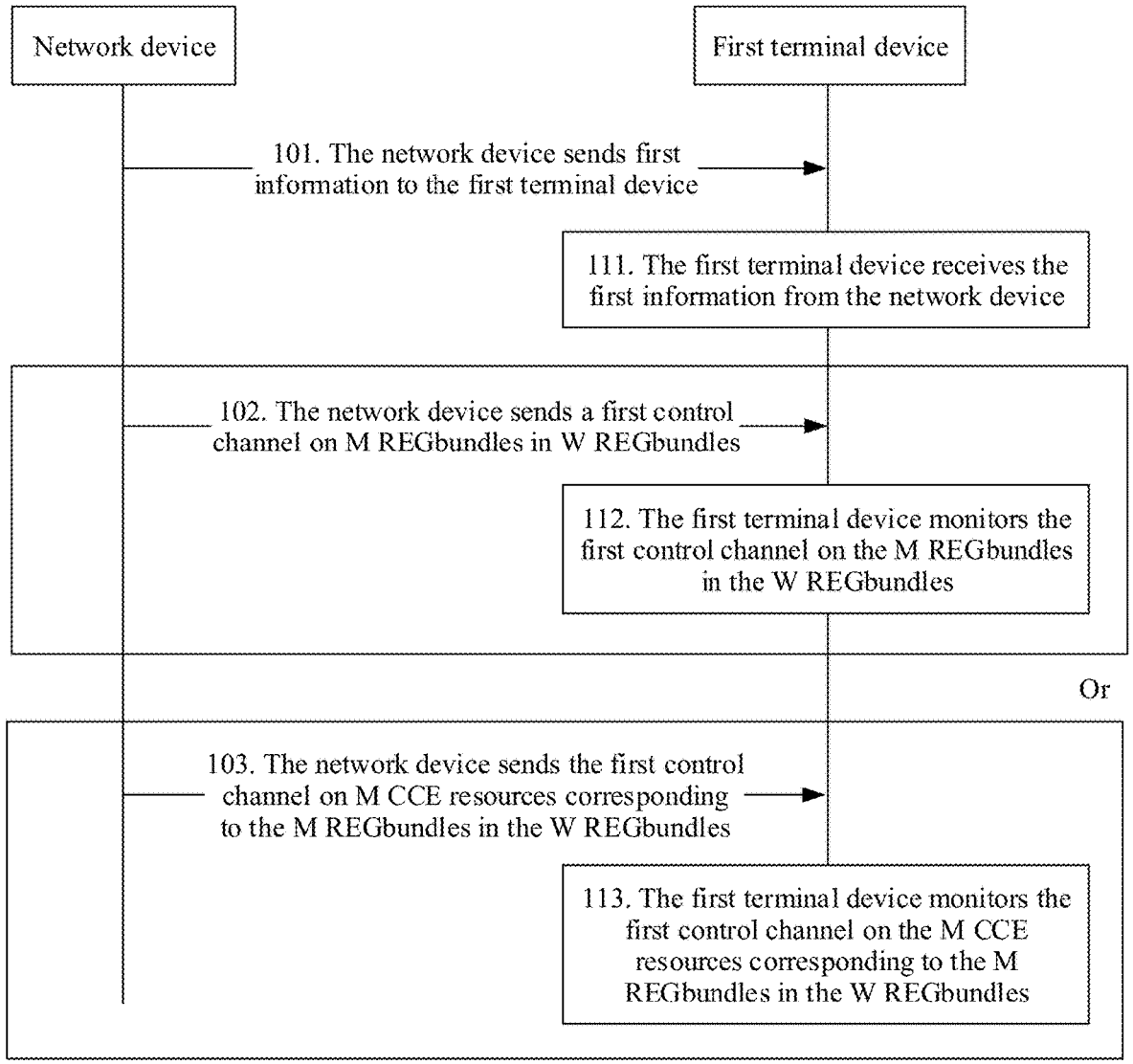
FIG. 1 is a schematic diagram of an interaction flow of a communication method according to an embodiment of this application.

Embodiments of this application provide a communication method and a communications apparatus, to be used by a terminal device to monitor a control channel on a resource applicable to a terminal device of this type, to implement communication between a network device and the terminal device of this type.

The following describes embodiments of this application with reference to the accompanying drawings.

The technical solutions provided in embodiments of this application may be applied to various communications systems, for example, a long term evolution (LTE) system, a 5G mobile communications system, a wireless-fidelity (Wi-Fi) system, a future communications system, a system in which a plurality of communications systems are integrated, or the like. This is not limited in embodiments of this application. 5G may also be referred to as new radio (NR).

The technical solutions provided in embodiments of this application may be applied to various communication scenarios, for example, may be applied to one or more of the following communication scenarios: eMBB, URLLC, mMTC, device-to-device (D2D) communication, vehicle to everything (V2X) communication, vehicle to vehicle (V2V) communication, internet of things (IoT), and the like.

A wireless communications system includes communications devices, and the communications devices may perform wireless communication with each other by using an air interface resource. The communications devices may include a network device and a terminal device, and the network device may also be referred to as a network side device. The air interface resource may include at least one of a time domain resource, a frequency domain resource, a code resource, and a space resource. In embodiments of this application, at least one may be further described as one or more, and the more may be two, three, four, or more. This is not limited in embodiments of this application. For example, the wireless communications system includes two communications devices, which are respectively a first communications device and a second communications device. The first communications device may be a network device, and the second communications device may be a terminal device.

In embodiments of this application, "/" may represent an "or" relationship between associated objects. For example, A/B may represent A or B. In formula calculation, "/" may represent a division sign. N/M represents N divided by M, and N and M each represent a value. "And/or" may be used to describe three relationships between associated objects. For example, A and/or B may represent three cases: Only A exists, both A and B exist, and only B exists. A and B may be singular or plural. For ease of describing the technical solutions in embodiments of this application, words such as "first", "second", "A", and "B" may be used to distinguish technical features having same or similar functions in embodiments of this application. The words such as "first" and "second", "A", and "B" do not limit a quantity and an execution sequence, and the words such as "first" and "second", "A", and "B" do not indicate a definite difference. In embodiments of this application, words such as "exemplary" or "for example" are used to indicate examples, instances, or descriptions. Any embodiment or design solution described as "exemplary" or "for example" should not be construed as being more preferred or superior to other embodiments or design solutions. Use of words such as "exemplary" or "for example" is intended to present related concepts in a specific manner and facilitate understanding.

The terminal device in embodiments of this application may also be referred to as a terminal, and may be a device with a wireless transceiver function. The terminal device may be deployed on land, including indoor, outdoor, handheld, or vehicle-mounted devices, or may be deployed on a water surface (such as a ship); or may be deployed in air (for example, on aircrafts, balloons, or satellites). The terminal device may be user equipment (UE). The UE includes a handheld device, a vehicle-mounted device, a wearable device, or a computing device that has a wireless communication function. For example, the UE may be a mobile phone (mobile phone), a tablet computer, or a computer with a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of the terminal device may be a terminal device, or may be an apparatus that can support the terminal device in implementing the function, for example, a chip system. The apparatus may be installed in the terminal device, or the apparatus may be used in cooperation with the terminal device. In this embodiment of this application, the chip system may include a chip, or may include a chip and another discrete component. In embodiments of this application, an example in which the apparatus configured to implement the function of the terminal device is a terminal device is used to specifically describe the technical solutions provided in embodiments of this application.

The terminal device in the mMTC scenario may be a reduced capability (REDCAP) terminal device. The REDCAP terminal device may also be referred to as a light terminal device. For example, the REDCAP terminal device in an NR system has a lower capability than a conventional terminal device. For example, the REDCAP terminal device has one or more of the following characteristics compared with the conventional terminal device: The REDCAP terminal device supports narrower bandwidth, is configured with fewer antennas, supports lower maximum transmit power, supports a lower duplex capability (for example, the conventional terminal device supports full-duplex frequency division duplex, and the REDCAP terminal device supports half-duplex frequency division duplex), and has a weaker data processing capability (for example, the REDCAP terminal device may process less data than the conventional terminal device within a same time, or the REDCAP terminal device has a longer processing time than the conventional terminal device when processing same data). Therefore, the REDCAP terminal device and the conventional terminal device may require different system information, dedicated access networks, and/or control channels with different performance. The conventional terminal device may be a non-REDCAP terminal device, and the non-REDCAP terminal device mainly supports an eMBB service and/or a URLLC service. Compared with the REDCAP terminal device, the conventional terminal device may be regarded as a high-capability terminal device or a terminal device with unlimited capabilities. Optionally, the conventional terminal device may be replaced with a terminal device that will be introduced in the future and that has higher capabilities than the REDCAP terminal device. For example, a first terminal device may be the REDCAP terminal device, and a second terminal device may be the conventional terminal device.

The network device in embodiments of this application includes a base station (BS), and may be a device that is deployed in a radio access network and that can perform wireless communication with the terminal device. The base station may have a plurality of forms, for example, a macro base station, a micro base station, a relay station, and an access point. For example, the base station in embodiments of this application may be a base station in a 5G mobile communications system or a base station in LTE. The base station in the 5G mobile communications system may also be referred to as a transmission reception point (TRP) or a gNB. In embodiments of this application, the apparatus configured to implement a function of the network device may be a network device, or may be an apparatus that can support the network device in implementing the function, for example, a chip system. The apparatus may be installed in the network device, or the apparatus may be used in cooperation with the network device. In embodiments of this application, an example in which the apparatus configured to implement the function of the network device is a network device is used to specifically describe the technical solutions provided in embodiments of this application.

The technical solutions provided in embodiments of this application may be applied to wireless communication between communications devices. The wireless communication between communications devices may include: wireless communication between a network device and a terminal device, wireless communication between network devices, or wireless communication between terminal devices. In embodiments of this application, the term "wireless communication" may also be briefly referred to as "communication", and the term "communication" may also be described as "data transmission", "information transmission", or "transmission". The technical solutions may be used to perform wireless communication between a scheduling entity and a subordinate entity, where the scheduling entity may allocate a resource to the subordinate entity. A person skilled in the art may use the technical solutions provided in embodiments of this application to perform wireless communication between another scheduling entity and another subordinate entity, for example, wireless communication between a macro base station and a micro base station, or wireless communication between a first-type terminal device and a second-type terminal device. The first-type terminal device and the second-type terminal device may represent two terminal devices of different types. For example, the first-type terminal device may be a terminal device used for an industry wireless sensor network (IWSN), and the second-type terminal device may be a terminal device used for video surveillance. Alternatively, the first-type terminal device may be a type 1 of a reduced capability terminal device, and the second-type terminal device may be a type 2 of a reduced capability terminal device and a non-reduced capability terminal device. For example, the first-type terminal device may be a terminal device used for the industry wireless sensor network, and the second-type terminal device may be a terminal device used for video surveillance and an enhanced mobile broadband (eMBB) terminal device.

An embodiment of this application provides a communication method, applicable to a communication scenario between a network device and a plurality of types of terminal devices. Different types of terminal devices may be provided with resources applicable to these types of terminal devices. For example, a REDCAP terminal device may be provided with M REGbundles in W REGbundles applicable to the REDCAP terminal device or M CCE resources corresponding to the M REGbundles, to meet communication requirements of various types of terminal devices. For example, bandwidth supported by the REDCAP terminal device is different from that supported by a conventional terminal device, or an aggregation level (AL) supported by the REDCAP terminal device is different from that supported by the conventional terminal device, or a quantity of candidate control channels supported by the REDCAP terminal device is different from a quantity of candidate control channels supported by the conventional terminal device.

It should be noted that, mMTC user equipment in this embodiment of this application may include a RADCAP terminal device. For example, the mMTC user equipment may be low-complexity user equipment, narrow-bandwidth user equipment, an internet of things device, or a low-end intelligent handheld terminal. Maximum bandwidth supported by the mMTC user equipment is less than 100 MHz. It should be noted that, the mMTC user equipment in the present invention is not only a device of machine-type communication, but may also be an intelligent handheld terminal.

In this embodiment of this application, when the maximum bandwidth supported by the mMTC user equipment is less than a frequency width included in a control resource set (coreset) x, the mMTC user equipment cannot determine a PDCCH resource and/or a candidate CCE location based on a resource manner used during Rel-15 NR PDCCH interleaving. Therefore, the PDCCH resource and/or the candidate CCE location of the mMTC user equipment needs to be determined based on a manner provided in this embodiment of this application. In this way, both the conventional UE and the mMTC user equipment can monitor their respective control channels on the coreset x, to avoid configuration of coresets for the conventional UE and the mMTC user equipment, respectively. This improves system resource utilization efficiency and increases signaling indication overheads. x may be 0, or x is a positive integer.

FIG. 1 is a schematic diagram of an interaction flow between a network device and a terminal device according to an embodiment of this application. In this interaction flow, operation 101 to operation 103 are described from the side of the network device, and operation 111 to operation 112 are described from the side of a first terminal device. The interaction flow shown in FIG. 1 mainly includes the following operations.

Operation 101. The network device sends first information to the first terminal device, where the first information is used to indicate a first control resource set, a quantity of resource blocks of the first control resource set is N, a quantity of resource element group bundles REGbundles of the first control resource set is W, and bandwidth supported by the first terminal device is less than bandwidth corresponding to the N resource blocks, and N and W are positive integers.

The quantity of the resource blocks of the first control resource set is N, a specific value of N is not limited, and N may be a positive integer. For example, the first control resource set may be a CORESET 0, that is, a control resource set numbered 0. For example, the first control resource set includes a frequency domain parameter and a time domain parameter, and the frequency domain parameter is a size of the first control resource set in frequency domain. For example, N may be a multiple of any six resource blocks (RB). The time domain parameter is a length of symbols occupied by the first control resource set in time domain. For example, the time domain parameter is configured by control resource set duration (ControlResourceSet.duration) in a radio resource control (RRC) parameter.

The quantity of the resource element group bundles (REGbundle) of the first control resource set is W, a specific value of W is not limited, and W may be a positive integer. For example, the first control resource set may be the CORESET 0, that is, the control resource set numbered 0. The REGbundles may include a plurality of resource element group bundles (REG). One REG includes one RB in frequency domain and one orthogonal frequency division multiplexing (OFDM) symbol in time domain. A size of the REGbundle is determined by a parameter L, which is defined by a resource element group bundle size (reg-bundle-size) in RRC parameters.

In this embodiment of this application, the network device needs to determine an attribute feature of the first terminal device, and then determine the first control resource set for the first terminal device. The attribute (or type) feature of the first terminal device may satisfy the following: Bandwidth supported by the first terminal device is less than bandwidth corresponding to the N resource blocks, so that the first terminal device can perform communication within the bandwidth corresponding to the N resource blocks.

Operation 111. The first terminal device receives the first information from the network device, where the first information is used to indicate the first control resource set, the quantity of the resource blocks of the first control resource set is N, the quantity of resource element group bundles REGbundles of the first control resource set is W, and the bandwidth supported by the first terminal device is less than the bandwidth corresponding to the N resource blocks, and N and W are positive integers.

After obtaining the attribute feature satisfied by the first terminal device, the network device determines the first control resource set for the first terminal device, and the network device sends the first information to the first terminal device. The first information is used to indicate the first control resource set, so that the first terminal device can determine the foregoing first control resource set by receiving the first information. For example, the first information may be control resource set configuration information.

In this embodiment of this application, the network device may send a first control channel, and a mapped resource may be a REGbundle, or a control channel element (CCE). One CCE includes a plurality of REGs. Sizes of REGbundles of different CCEs are different. When the network device sends the first control channel, if the mapped resource is a REGbundle, operation 102 is performed, and correspondingly, the first terminal device performs operation 112; or when the network device sends the first control channel, if the mapped resource is a CCE resource, operation 103 is performed, and correspondingly, the first terminal device performs operation 113. Specifically, it may be determined, based on an application scenario, to perform operation 102 and operation 103 or operation 112 and operation 113.

Operation 102. The network device sends the first control channel on M REGbundles in the W REGbundles, where M is less than W, indexes {i, i+1, . . . , i+(Y−1)} of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first terminal device, i, Y, and X are values determined by the first terminal device, M and Y are positive integers, and i and X are integers greater than or equal to 0.

In this embodiment of this application, after sending the first information to the first terminal device, the network device determines the M REGbundles in the W REGbundles, M is less than W, W represents the quantity of REGbundles of the first control resource set, and a value of M is not limited. The network device may send the first control channel to the first terminal device on the M REGbundles. For example, the first control channel is one or more control channels determined by the base station. There is a correspondence between the indexes of the REGbundles and the indexes of the CCE resources.

The indexes {i, i+1, . . . , i+(Y−1)} of the Y REGbundles in the M REGbundles are consecutive, the indexes {i+(Y+X), i+(Y+X+1), . . . , i+(M−1+X)} of the remaining (M−Y) REGbundles in the M REGbundles are consecutive, and the network device may send the first control channel on the REGbundles corresponding to {i, i+1, . . . , i+(Y−1)} and the REGbundles corresponding to {i+(Y+X), i+(Y+X+1), . . . , i+(M−1+X)}. Therefore, the first terminal device may monitor the control channel on the M REGbundles, to implement communication between the first terminal device and the network device. In this solution, the network device can send the control channel to the first terminal device, and the first terminal device is different from a second terminal device, so that requirements of different types of terminal devices for the control channel can be met.

It should be noted that, when Y is equal to M, indexes {i, i+1, . . . , i+(M−1)} of the M REGbundles are consecutive. The network device may send the first control channel on the REGbundles corresponding to {i, i+1, . . . , i+(M−1)}. Therefore, the first terminal device may monitor the control channel on the M REGbundles, to implement communication between the first terminal device and the network device. In this solution, the network device can send the control channel to the first terminal device, and the first terminal device is different from a second terminal device, so that requirements of different types of terminal devices for the control channel can be met.

Operation 112. The first terminal device monitors the first control channel on the M REGbundles in the W REGbundles, where M is less than W, the indexes {i, i+1, . . . , i+(Y−1)} of the Y REGbundles in the M REGbundles are consecutive, the indexes {i+(Y+X), i+(Y+X+1), . . . , i+(M−1+X)} of the remaining (M−Y) REGbundles in the M REGbundles are consecutive, M represents the quantity of the available REGbundles of the first terminal device, i, Y, and X are the values determined by the first terminal device, M and Y are positive integers, and i and X are integers greater than or equal to 0.

In this embodiment of this application, after receiving the first information, the first terminal device determines the M REGbundles in the W REGbundles, M is less than W, W represents the quantity of the REGbundles of the first control resource set, and the value of M is not limited. The first terminal device may receive the first control channel on the M REGbundles. For example, the first control channel is one or more control channels determined by the base station. There is a correspondence between the indexes of the REGbundles and the indexes of the CCE resources.

The indexes {i, i+1, . . . , i+(Y−1)} of the Y REGbundles in the M REGbundles are consecutive, the indexes {i+(Y+X), i+(Y+X+1), . . . , i+(M−1+X)} of the remaining (M−Y) REGbundles in the M REGbundles are consecutive, and the network device may send the first control channel on the REGbundles corresponding to {i, i+1, . . . , i+(Y−1)} and the REGbundles corresponding to {i+(Y+X), i+(Y+X+1), . . . , i+(M−1+X)}. Therefore, the first terminal device may monitor the control channel on the M REGbundles, to implement communication between the first terminal device and the network device. In this solution, the network device can send the control channel to the first terminal device, and the first terminal device is different from a second terminal device, so that requirements of different types of terminal devices for the control channel can be met.

It should be noted that, when Y is equal to M, indexes {i, i+1, . . . , i+(M−1)} of the M REGbundles are consecutive. The network device may send the first control channel on the REGbundles corresponding to {i, i+1, . . . , i+(M−1)}. Therefore, the first terminal device may monitor the control channel on the M REGbundles, to implement communication between the first terminal device and the network device. In this solution, the network device can send the control channel to the first terminal device, and the first terminal device is different from a second terminal device, so that requirements of different types of terminal devices for the control channel can be met.

In some embodiments of this application, X is a fixed value, or X is a value determined according to a pre-rule, or X is a value indicated by explicit signaling, or X is a value indicated implicitly; Y is a fixed value, or Y is a value determined according to a pre-rule, or Y is a value indicated by explicit signaling, or Y is a value indicated implicitly; i is a fixed value, or i is a value determined according to a pre-rule, or i is a value indicated by explicit signaling, or i is a value indicated implicitly. X, Y, and i may be determined independently. X, Y, and i are specifically determined based on an application scenario. Explicit signaling refers to quality sent by the network device to the first terminal device, and implicit indication is implied indication based on another instruction sent by the network device to the first terminal device. The fixed value is a value that has been fixed and known in advance, and the pre-rule may be a stipulation in a communication protocol.

Alternatively, C1 is a fixed value, or C1 is a value determined according to a pre-rule, or C1 is a value indicated by explicit signaling, or C1 is a value indicated implicitly; C2 is a fixed value, or C2 is a value determined according to a pre-rule, or C2 is a value indicated by explicit signaling, or C2 is a value indicated implicitly; Y is a fixed value, or Y is a value determined according to a pre-rule, or Y is a value indicated by explicit signaling, or Y is a value indicated implicitly. C1, Y, and C2 may be determined independently. C1, Y, and C2 are specifically determined based on an application scenario. Explicit signaling refers to quality sent by the network device to the first terminal device, and implicit indication is implied indication based on another instruction sent by the network device to the first terminal device. The fixed value is a value that has been fixed and known in advance, and the pre-rule may be a stipulation in a communication protocol.

Operation 103. The network device sends the first control channel on M control channel element CCE resources corresponding to the M REGbundles in the W REGbundles, where M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or, indexes of the M CCE resources in the M CCE resources are {C1, C1+2, . . . , C1+(M−1)×2}; M represents the quantity of the available REGbundles of the first terminal device, C1, C2, Y, and X are values determined by the first terminal device, M and Y are positive integers, and C1 and C2 are integers greater than or equal to 0.

In this embodiment of this application, after sending the first information to the first terminal device, the network device determines the M CCE resources corresponding to the M REGbundles in the W REGbundles, M is less than W, W represents the quantity of the REGbundles of the first control resource set, and the value of M is not limited. The network device may send the first control channel to the first terminal device on the M CCE resources corresponding to the M REGbundles. For example, the first control channel is one or more control channels determined by the base station. There is a correspondence between the indexes of the REGbundles and the indexes of the CCE resources.

The indexes of the Y CCE resources are {C1, C1+2, . . . , C1+(Y−1)×2}, the indexes of the remaining (M−Y) CCE resources in the M CCE resources are {C2, C2+2, . . . , C2+(M−Y−1)×2}, and the network device may send the first control channel on the CCE resources corresponding to {C1, C1+2, . . . , C1+(Y−1)×2} and the CCE resources corresponding to {C2, C2+2, ..., C2+(M−Y−1)×2}. Therefore, the first terminal device may monitor the control channel on the M CCE resources, to implement communication between the first terminal device and the network device. In this solution, the network device can send the control channel to the first terminal device, and the first terminal device is different from a second terminal device, so that requirements of different types of terminal devices for the control channel can be met.

It should be noted that, when Y is equal to M, indexes {C1, C1+2, ..., C1+(M−1)×2} of the M CCE resources are consecutive. The network device may send the first control channel on the CCE resources corresponding to {C1, C1+2, ..., C1+(M−1)×2}. Therefore, the first terminal device may monitor the control channel on the M CCE resources, to implement communication between the first terminal device and the network device. In this solution, the network device can send the control channel to the first terminal device, and the first terminal device is different from a second terminal device, so that requirements of different types of terminal devices for the control channel can be met.

Operation 113. The first terminal device monitors the first control channel on the M control channel element CCE resources corresponding to the M REGbundles in the W REGbundles, where M is less than W, the indexes of the Y CCE resources in the M CCE resources are {C1, C1+2, ... C1+(Y−1)×2}, and the indexes of the remaining (M−Y) CCE resources in the M CCE resources are {C2, C2+2, ..., C2+(M−Y−1)×2}; or, the indexes of the M CCE resources in the M CCE resources are {C1, C1+2, ..., C1+(M−1)×2}; M represents the quantity of the available REGbundles of the first terminal device, C1, C2, Y, and X are values determined by the first terminal device, M and Y are positive integers, and C1 and C2 are integers greater than or equal to 0.

In this embodiment of this application, after receiving the first information, the first terminal device determines the M CCE resources corresponding to the M REGbundles in the W REGbundles, M is less than W, W represents the quantity of the REGbundles of the first control resource set, and the value of M is not limited. The first terminal device may receive the first control channel on the M CCE resources corresponding to the M REGbundles. For example, the first control channel is one or more control channels determined by the base station. There is a correspondence between the indexes of the REGbundles and the indexes of the CCE resources.

The indexes of the Y CCE resources are {C1, C1+2, ..., C1+(Y−1)×2}, the indexes of the remaining (M−Y) CCE resources in the M CCE resources are {C2, C2+2, ..., C2+(M−Y−1)×2}, and the network device may send the first control channel on the CCE resources corresponding to {C1, C1+2, ..., C1+(Y−1)×2} and the CCE resources corresponding to {C2, C2+2, ..., C2+(M−Y−1)×2}. Therefore, the first terminal device may monitor the control channel on the M CCE resources, to implement communication between the first terminal device and the network device. In this solution, the network device can send the control channel to the first terminal device, and the first terminal device is different from a second terminal device, so that requirements of different types of terminal devices for the control channel can be met.

It should be noted that, when Y is equal to M, indexes {C1, C1+2, ..., C1+(M−1)×2} of the M CCE resources are consecutive. The network device may send the first control channel on the CCE resources corresponding to {C1, C1+2, ..., C1+(M−1)×2}. Therefore, the first terminal device may monitor the control channel on the M CCE resources, to implement communication between the first terminal device and the network device. In this solution, the network device can send the control channel to the first terminal device, and the first terminal device is different from a second terminal device, so that requirements of different types of terminal devices for the control channel can be met.

In some embodiments of this application, i is determined based on one or more of the bandwidth supported by the first terminal device, a quantity $l$ of symbols included in the first control resource set, N, W, a subcarrier spacing, a frequency range, a cell identifier, a radio frame number, a subframe number, and a slot number; and/or, Y is determined based on one or more of the bandwidth supported by the first terminal device, the quantity $l$ of symbols, N, W, the subcarrier spacing, the frequency range, the cell identifier, the radio frame number, the subframe number, and the slot number; and/or, X is determined based on one or more of the bandwidth supported by the first terminal device, the quantity $l$ of symbols, N, W, the subcarrier spacing, the frequency range, the cell identifier, the radio frame number, the subframe number, and the slot number; and/or, C1 is determined based on one or more of the bandwidth supported by the first terminal device, the quantity $l$ of symbols, N, W, the subcarrier spacing, the frequency range, the cell identifier, the radio frame number, the subframe number, and the slot number; and/or, C2 is determined based on one or more of the bandwidth supported by the first terminal device, the quantity $l$ of symbols, N, W, the subcarrier spacing, the frequency range, the cell identifier, the radio frame number, the subframe number, and the slot number.

In some embodiments of this application, for different quantities $l$ of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

In some embodiments of this application, i={n+Z} mod (W/2), where n represents an identifier of a cell in which the first terminal device is located, $Z=W/2-2^{l-u}$, l represents the quantity of symbols included in the first control resource set, u is a subcarrier spacing parameter, and mod represents a REM operation; and/or, Y=M/2, or $Y=2^{l-u}$, where l represents the quantity of symbols included in the first control resource set, and u is the subcarrier spacing parameter; and/or, $X=W/2-2^{l-u+1}$, where l represents the quantity of symbols included in the first control resource set, and u is the subcarrier spacing parameter; and/or, $X=[W/2-2^{l-u+1}]/2$, where l represents the quantity of symbols included in the first control resource set, and u is the subcarrier spacing parameter; and/or, $X=W/2-2^{l-1}$, where l represents the quantity of symbols included in the first control resource set, and u is the subcarrier spacing parameter.

It should be noted that, i={n+Z} mod (W/2) in this embodiment of this application may be understood as that i satisfies the following relationship: i={n+Z} mod (W/2). Similarly, Y=M/2 may be understood as that Y satisfies the following relationship: Y=M/2. The meaning of "=" is applicable to other expressions that are not listed. Descriptions are merely provided herein.

In some embodiments of this application, for different quantities l of symbols and different quantities N of resource blocks of the first control resource set, and different bandwidth ranges supported by the first terminal device, values of C1, C2, and Y have a plurality of cases. After C1, C2, and Y are determined, CCE resources that can be used by the first terminal device can be determined, so that the first terminal device can monitor the control channel.

In some embodiments of this application, $C1=2N1+T$, where $N1=W/2-2^{l-u}$; when a result obtained through n mod W is greater than or equal to $2^{l-u}$ and less than or equal to $2^{l-u}+W/2-1$, $T=1$; when the result obtained through n mod W is less than $2^{l-u}$ or greater than $2^{l-u}+W/2-1$, $T=0$, where N represents an identifier of a cell in which the first terminal device is located, l represents the quantity of symbols included in the first control resource set, u is a subcarrier spacing parameter, and mod represents a REM operation; and/or, $C2=2N2+1-T$, where $N2=W/2-2^{l-u+1}$, or $N2=(W/2-2^{l-u+1})/2$; when the result obtained through n mod W is greater than or equal to $2^{l-u}$ and less than or equal to $2^{l-u}+W/2-1$}, $T=1$; when the result obtained through n mod W is less than $2^{l-u}$ or greater than $2^{l-u}+W/2-1$, $T=0$, where n represents the identifier of the cell in which the first terminal device is located, l represents the quantity of symbols included in the first control resource set, u is the subcarrier spacing parameter; and/or, $Y=M/2$, or $Y=2^{l-u}$, where l represents the quantity of symbols included in the first control resource set, and u is the subcarrier spacing parameter.

In some embodiments of this application, for different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

In some embodiments of this application, $i=n \mod (W/2)+Z$, where n represents an identifier of a cell in which the first terminal device is located, $Z=W/2-2^{l-u+1}$, or $Z=[W/2-2^{l-u+1}]/2$, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter; and/or, $X=0$.

In some embodiments of this application, for different quantities l of symbols and different quantities N of resource blocks of the first control resource set, and different bandwidth ranges supported by the first terminal device, values of C1, C2, and Y have a plurality of cases. After C1, C2, and Y are determined, CCE resources that can be used by the first terminal device can be determined, so that the first terminal device can monitor the control channel.

In some embodiments of this application, $C1=2N1+T$, where $N1=W/2-2^{l-u+1}$, or $N1=[W/2-2^{l-u+1}]/2$; when a result obtained through n mod W is greater than or equal to 0 and less than or equal to $W/2-1$, $T=0$; when the result obtained through n mod W is greater than $W/2-1$, $T=1$, where n represents an identifier of a cell in which the first terminal device is located, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter.

In some embodiments of this application, the monitoring a first control channel in operation 112 includes: monitoring the first control channel in a first resource subset or a second resource set. For different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

i, Y, and X in the first resource subset satisfy the following feature: When a result obtained through n mod W/2 is greater than or equal to 1 and less than or equal to $2^{l+1}$, $i=0$, where $Y=n \mod W/2$, and $X=Z$; when the result obtained through n mod W/2 is less than 1 or greater than or equal to $2^{l+1}$, $i=(n+Z) \mod W/2$, and $X=0$, where $Z=W/2-2^{l-u+1}$, or $Z=[W/2-2^{l-u+1}]/2$, n represents an identifier of a cell in which the first terminal device is located, l represents the quantity of symbols included in the first control resource set, u is a subcarrier spacing parameter, and mod represents a REM operation; and/or, i, Y, and X in the second resource subset satisfy the following feature: When the result obtained through n mod W/2 is greater than or equal to 1 and less than or equal to $2^{l+1}$, $i=W/2$, $Y=n \mod W/2$, and $X=Z$; when the result obtained through n mod W/2 is less than 1 or greater than or equal to $2^{l+1}$, $i=(n+Z) \mod W/2+W/2$, and $X=0$, where $Z=W/2-2^{l-u+1}$ or $Z=[W/2-2^{l-u+1}]/2$, n represents the identifier of the cell in which the first terminal device is located, l represents the quantity of symbols included in the first control resource set, u is the subcarrier spacing parameter, and mod represents the REM operation.

In some embodiments of this application, the monitoring a first control channel in operation 113 includes: monitoring the first control channel in a first resource subset or a second resource set. For different quantities l of symbols and different quantities N of resource blocks of the first control resource set, and different bandwidth ranges supported by the first terminal device, values of i, X, and Y have a plurality of cases. After i, X, and Y are determined, REGbundles that can be used by the first terminal device can be determined, so that the first terminal device can monitor the control channel.

i, Y, and X in the first resource subset satisfy the following feature: When a result obtained through n mod W is greater than or equal to 1 and less than or equal to N, $C1=W+1-(n \mod W) \times 2$, $Y=n \mod 2^{l+1}$, and $C2=Z$; when the result obtained through n mod W is greater than or equal to $1+W/2$ and less than or equal to $N+W/2$, $C1=W-(n \mod W) \times 2$, $Y=n \mod 2^{l+1}$, $C2=Z+1$, and $N2=n \mod W/2$; when the result obtained through n mod W is greater than or equal to $N+1$ and less than or equal to $W/2$, $C1=Z+1$; when the result obtained through n mod W is less than 1 or greater than $N+W/2$, $C1=Z$, where $N=2^{l+1}$, $Z=W/2-2^{l-u+1}$ or $Z=[W/2-2^{l-u+1}]/2$, n represents an identifier of a cell in which the first terminal device is located, l represents the quantity of symbols included in the first control resource set, u is a subcarrier spacing parameter, and mod represents a REM operation; and/or, i, Y, and X in the second resource subset satisfy the following feature: When the result obtained through n mod W is greater than or equal to 1 and less than or equal to N, $C1=W-(N \mod W) \times 2$, $Y=n \mod 2^{l+1}$, and $C2=Z+1$; when the result obtained through n mod W is greater than or equal to 1+W/2 and less than or equal to N+W/2, C1=W+1−(n mod W)×2, Y=n mod $2^{l+1}$, C2=Z, and N2=n mod W/2; when n mod W is greater than or equal to N+1 and less than or equal to W/2, C1=Z; when n mod W is greater than or equal to 1 and less than or equal to N+W/2, C1=Z+1, where N=$2^{l+1}$, Z=W/2−$2^{l-u+1}$, or Z=[W/2−$2^{l-u+1}$]/2, n represents the identifier of the cell in which the first terminal device is located, l represents the quantity of symbols included in the first control resource set, u is the subcarrier spacing parameter, and mod represents the REM operation.

In some embodiments of this application, the monitoring the first control channel in a first resource subset or a second resource set includes:

monitoring the first control channel on a resource of the first resource subset in a first time unit and monitoring the first control channel on a resource of the second resource subset in a second time unit.

The first time unit and the second time unit are different time units, so that the first terminal device can perform frequency hopping in different time units. Therefore, whether the first terminal device supports frequency hopping is determined in a CORESET resource mapping manner that supports frequency hopping, to be specific, resources are mapped to logical consecutive resources in a high frequency band or a low frequency band, and is determined according to a signaling indication or a rule.

In some embodiments of this application, the method provided in this embodiment of this application further includes:

Before sending the first information, the network device sends second information, where the second information indicates the first terminal device to monitor the first control channel on a resource of the first control resource set, or monitor the first control channel on a resource set not overlapping the first control resource set.

In some embodiments of this application, the method provided in this embodiment of this application further includes:

Before receiving the first information, the first terminal device receives second information, where the second information indicates the first terminal device to monitor the first control channel on a resource of the first control resource set, or monitor the first control channel on a resource set not overlapping the first control resource set.

The second information can indicate the first terminal device to monitor the first control channel on the resource of the first control resource set, or monitor the first control channel on the resource set not overlapping the first control resource set. If the first terminal device monitors the first control channel on the resource set not overlapping the first control resource set, the first terminal device can avoid a conflict of the first control resource set used by the second terminal device, so that a resource conflict problem existing when the first terminal device and the second terminal device coexist is resolved.

Figure 2A:
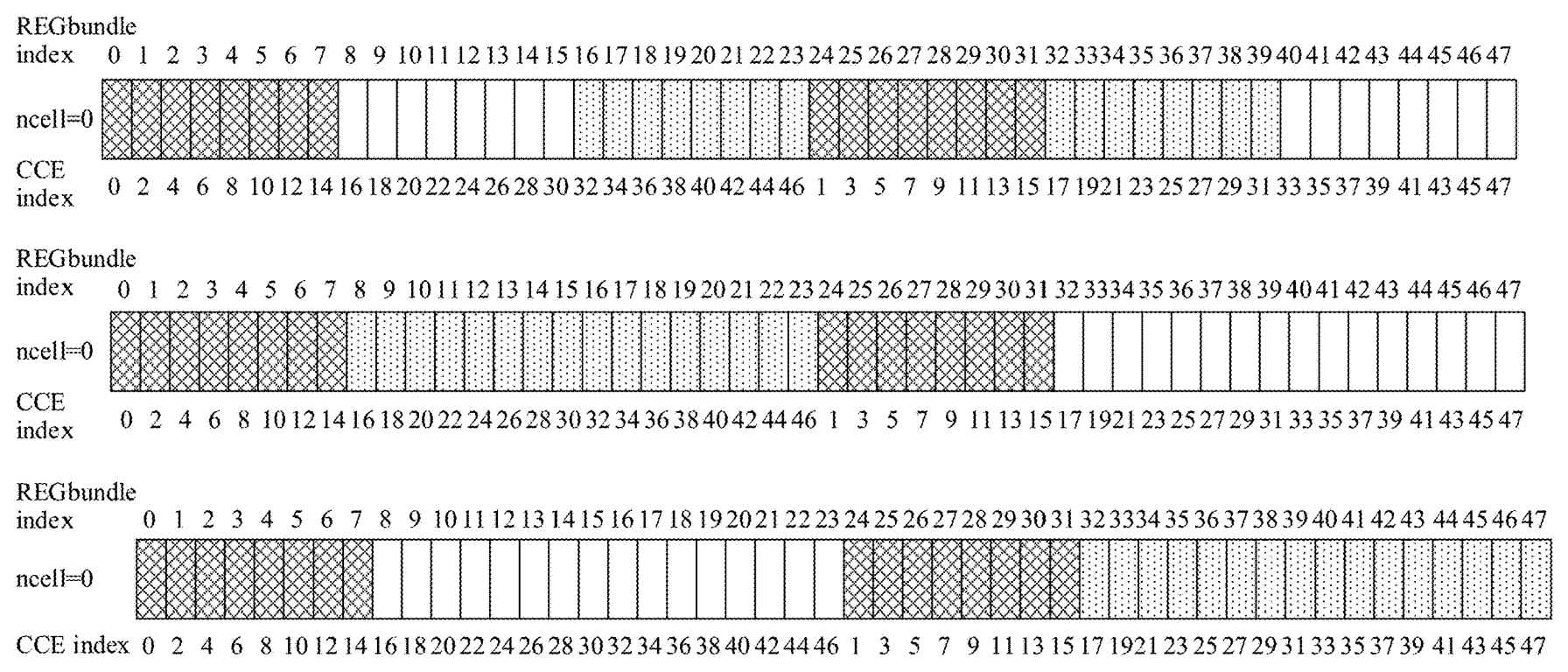

The following provides description by using examples. The first terminal device is REDCAP UE (RC UE for short) or NRL UE. As shown in FIG. 2a, a mesh grid represents a candidate control channel with an AL of 16 and that is supported by the second terminal device, and a dotted grid represents a candidate control channel supported by the first terminal device. A resource of legacy UE is mapped to a candidate control channel shown by the mesh grid box. Bandwidth that can be supported by the REDCAP UE is half of bandwidth included in the CORESET 0. When impact on the legacy UE is avoided as far as possible, a frequency domain resource range of the RC UE may be considered as the following two mapping manners. Resources used by the REDCAP UE may be non-consecutive (this manner is subsequently referred to as a mapping manner 1), or resources of the REDCAP UE are consecutive (this manner is subsequently referred to as a mapping manner 2). The mapping manner 1 and the mapping manner 2 may further determine the resources by using REGbundle indexes and CCE indexes separately. For details, refer to the following methods 1 to 4 described as examples in the following description. The resource mapping manner 1 corresponding to the methods 1 and 2 is described in Embodiment 1. The resource mapping manner 2 corresponding to the methods 3 and 4 is described in Embodiment 2. In this embodiment of this application, the legacy UE and the REDCAP UE share the CORESET 0, to ensure reliability of the REDCAP when an optional resource of the legacy UE is affected to the minimum extent.

Embodiment 1

To prevent, to the greatest extent, the REDCAP UE from causing interference to the legacy UE, at least resource locations corresponding to candidate control channels m=0 whose ALs are 16, 8, and 4, that is, candidate control channels shown by mesh grids in FIG. 2a, need to be avoided.

Method 1

The mapping manner 1 is a manner in which candidate control channels are non-consecutive, candidate control channel resources are classified into two groups, and a resource is determined based on a REGbundle index.

It is assumed that S1 is the first bundle index in the first group of REGbundles, and S2 is the first bundle index in the second group of REGbundles. Based on different quantities of RBs and symbols occupied by the CORESET 0, S1 and S2 are determined in the following method:

(1) When a total quantity of RBs occupied by the CORESET 0 is 96, and the quantity of symbols occupied by the CORESET 0 is 3, the CORESET includes 48 REGs.

S1={nshift+16} mod 24, and S2=S1+16, where nshift=ncell, and ncell is a cell identifier of the first terminal device.

A range of REGbundles used by the control channels of the REDCAP UE is: S1, S1+1, . . . , S1+7; S2, S2+1, . . . , S2+7. Alternatively, in an [S1, S2+7] interval, a corresponding frequency domain range is determined based on candidate control channels defined for the REDCAP UE.

Figure 2B:
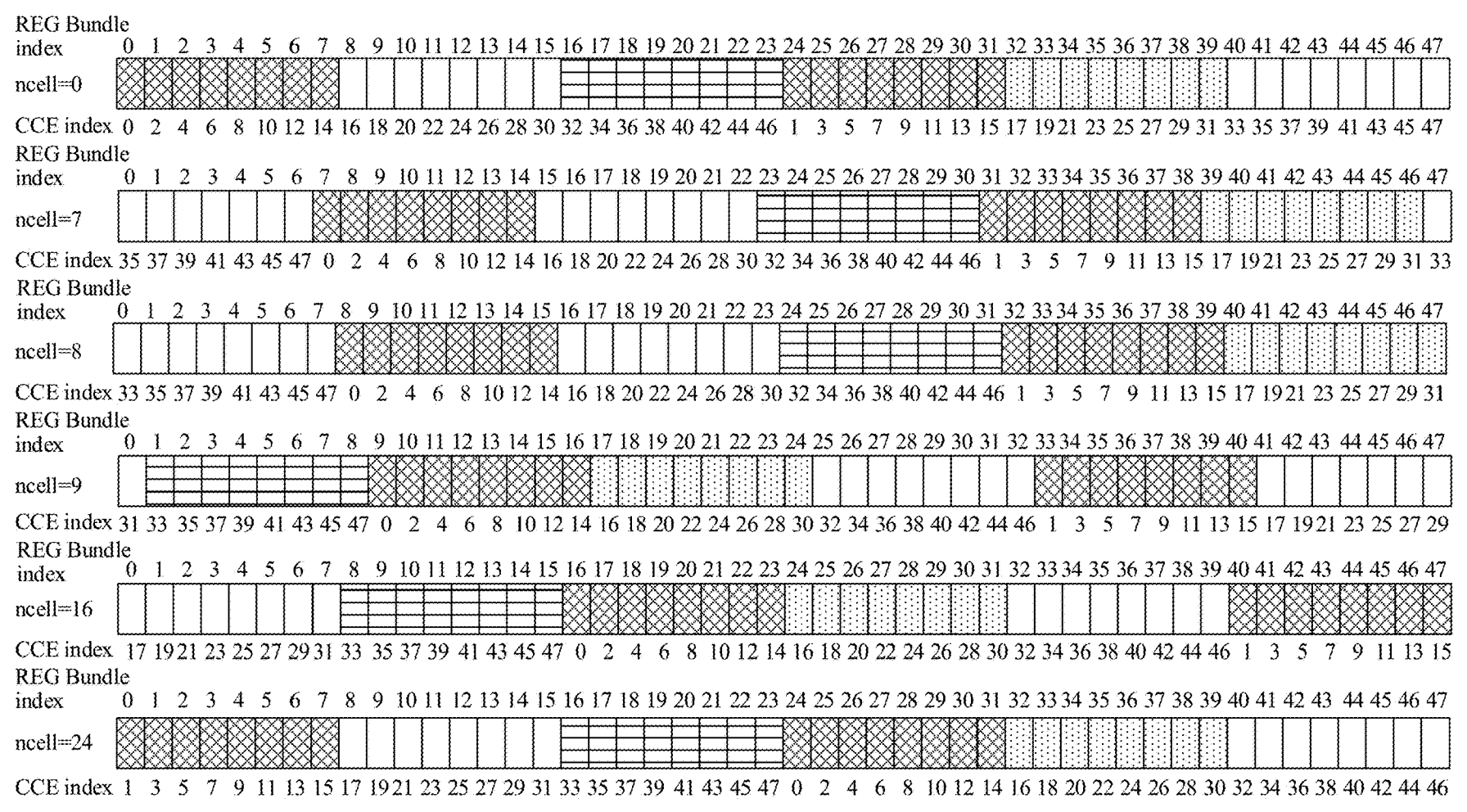
Figures 2C, 2D:
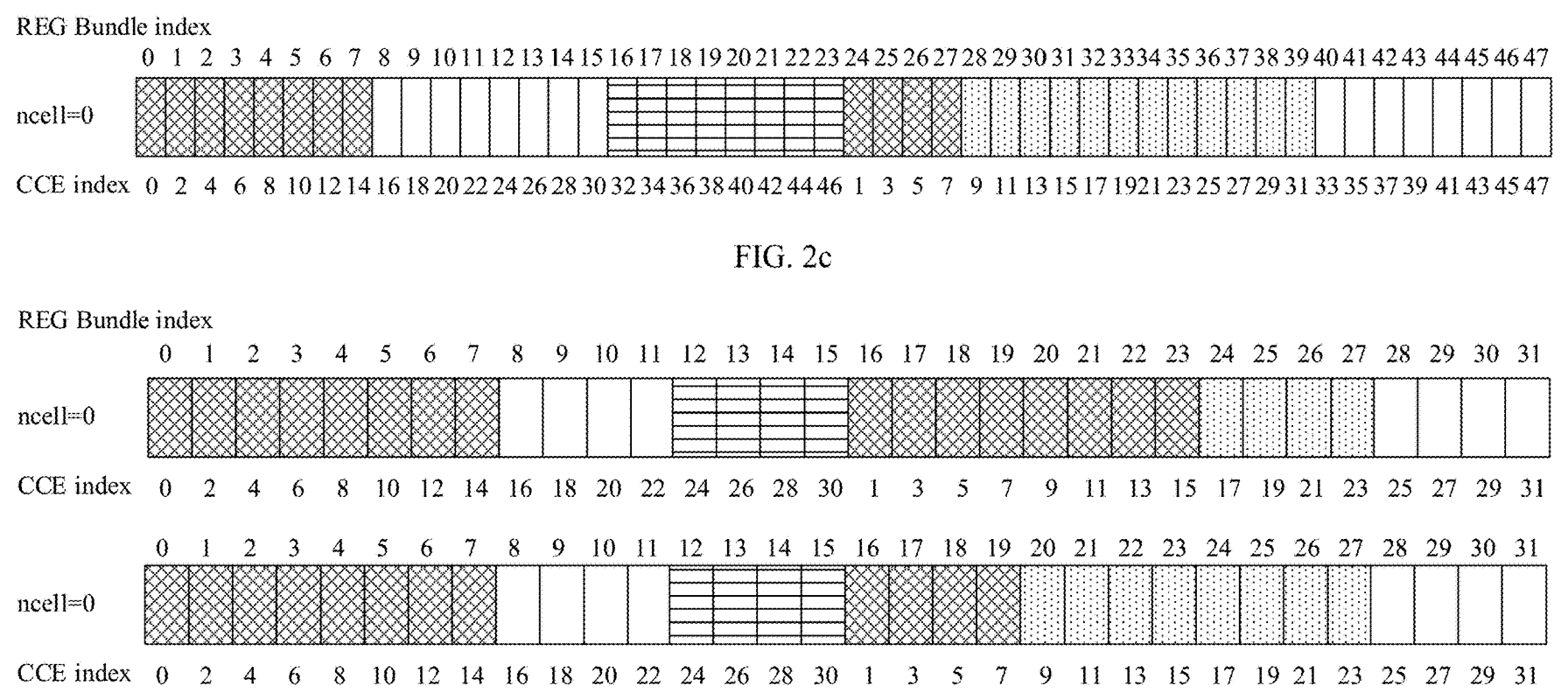

Specific examples of S1 and S2 are shown in FIG. 2b and FIG. 2c. Each index above the CORESET 0 corresponds to a REGbundle. The mesh grid represents the candidate control channel with an AL of 16 and that is supported by the second terminal device, and the dotted grid and a horizontal line grid represent candidate control channels supported by the first terminal device. For example, nshift=0; S1=16; S2=32. nshift=7; S1=23; S2=39. nshift=8; S1=0; S2=16. nshift=9; S1=1; S2=17. nshift=16; S1=8; S2=24. nshift=24; S1=16; S2=32. nshift=48; S1=16; S2=32.

In another example, when nshift=8, it may be alternatively that: S1=24; S2=40.

(2) When a total quantity of RBs occupied by the CORESET 0 is 96, and the quantity of symbols occupied by the CORESET 0 is 2, the CORESET includes 32 REGs.

Specific examples of S1 and S2 are shown in FIG. 2d. Each index above the CORESET 0 corresponds to a REGbundle. The mesh grid represents the candidate control channel with an AL of 16 and that is supported by the second terminal device, and the dotted grid and a horizontal line grid represent candidate control channels supported by the first terminal device.

S1={nshift+12} mod 16; S2=S1+12.

A range of REGbundles used by the control channels of the REDCAP UE is: S1, S1+1, . . . , S1+4; S2, S2+1, . . . , S2+4. Alternatively, in an [S1, S2+4] interval, a corresponding frequency domain range is determined based on candidate control channels defined for the REDCAP UE.

(3) When a total quantity of RBs occupied by the CORE-SET 0 is 96, and the quantity of symbols occupied by the CORESET 0 is 1, the CORESET includes 16 REGs.

Figure 2E:
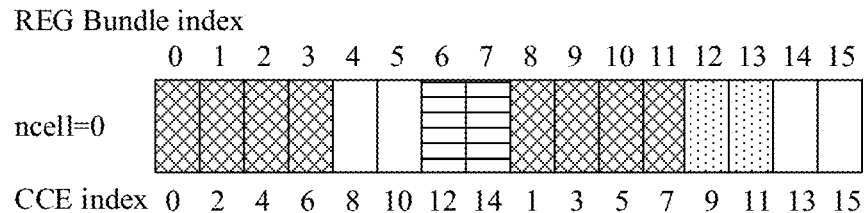
FIG. 2*a* to FIG. 2*z* are schematic diagrams of several candidate control channels according to an embodiment of this application.

Specific examples of S1 and S2 are shown in FIG. 2e. Each index above the CORESET 0 corresponds to a REGbundle. The mesh grid represents the candidate control channel with an AL of 16 and that is supported by the second terminal device, and the dotted grid and a horizontal line grid represent candidate control channels supported by the first terminal device.

S1={nshift+6} mod 8; S2=S1+6.

Figure 2F:
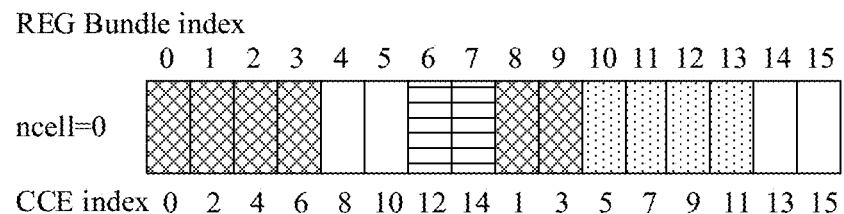

A range of REGbundles used by the control channels of the REDCAP UE is: S1, S1+1, S1+2; S2, S2+1, S2+2. Alternatively, as shown in FIG. 2f, in an [S1, S2+2] interval, a corresponding frequency domain range is determined based on candidate control channels defined for the RED-CAP UE.

It should be noted that, the foregoing examples are all for cases in which there are three symbols. Further, mapping is also performed for another quantity of symbols in a same manner, and details are not described herein again.

Figure 2G:
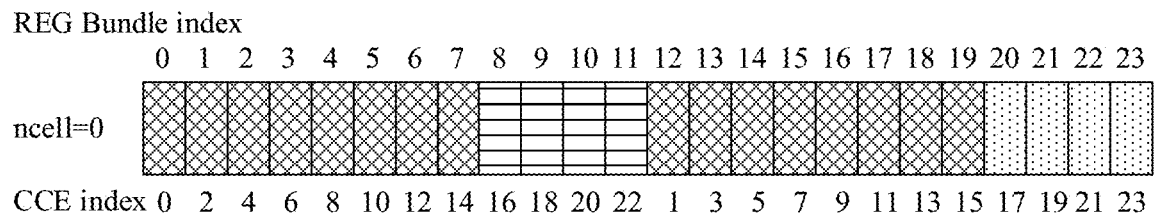
Figure 2G:
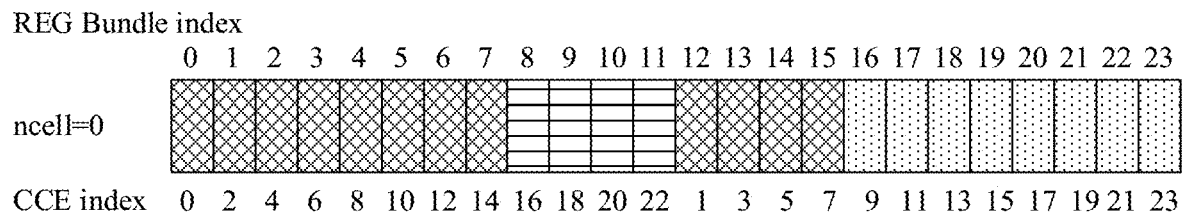

(4) As shown in FIG. 2g, when a subcarrier spacing is 30 kHz, the CORESET 0 includes a bandwidth of 20 M (that is, 48 RBs) and three orthogonal frequency division multiplexing (OFDM) symbols. Resources that can be used by the REDCAP UE include: candidate control channels shown by horizontal line grids and candidate control channels shown by dotted grids in FIG. 2g.

Figure 2H:
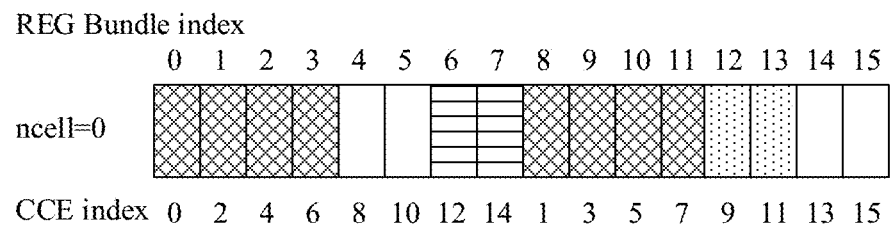
Figure 2I:
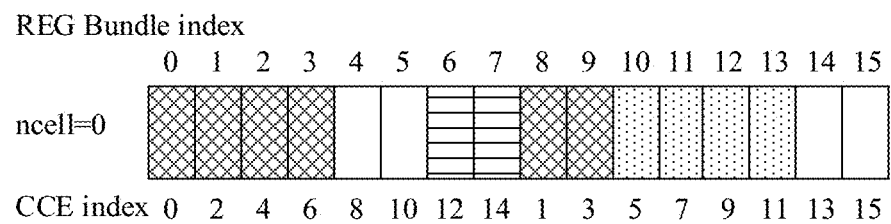

(5) As shown in FIG. 2h and FIG. 2i, when a subcarrier spacing is 30 kHz, the CORESET 0 includes a bandwidth of 20 M and two doses, and resources that can be used by the REDCAP UE include: candidate control channels shown by horizontal line grids and candidate control channels shown by dotted grids in FIG. 2h and FIG. 2i.

Figure 2J:
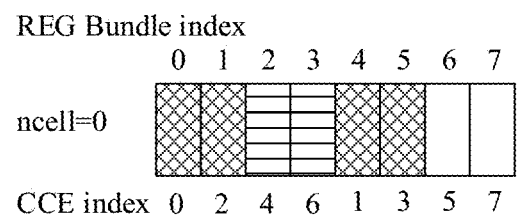

(6) As shown in FIG. 2j, when a subcarrier spacing is 30 kHz, the CORESET 0 includes a bandwidth of 20 M and one os, and resources that can be used by the REDCAP UE include: candidate control channels shown by horizontal line grids shown in FIG. 2j.

Based on the foregoing analysis, it can be learned that S1={nshift+N} mod (M/2); S2=S1+N.

M is a quantity of REGbundles or a quantity of CCEs. 1 is the quantity of symbols occupied by the coreset; and u is a subcarrier spacing parameter. As shown in the following Table 1, N=(M/2-$2^{l-u}$); nshift=ncellID.

| u | 0 | 1 | 2 | 3 |
|---|---|---|---|---|
| SCS (kHz) | 15 | 30 | 60 | 120 |

Available REGbundles are S1, S1+1, . . . , S1+M/4−1 and S2, S2+1, . . . , S2+M/4−1. Alternatively, in an [S1, S2+M/4−1] interval, a corresponding frequency domain range is determined based on candidate control channels defined for the REDCAP UE.

Method 2

In the mapping manner 1, a resource is determined based on a CCE index.

It is assumed that C1 is the first CCE index of the first group, and C2 is the first CCE index of the second group.

If a maximum AL supported by the REDCAP UE is 16, a range of CCEs used by the control channels of the REDCAP UE is C1, C1+2, . . . , C1+14; C2, C2+2, . . . , C2+14.

(1) When a total quantity of RBs occupied by the CORE-SET 0 is 96, and the quantity of symbols occupied by the CORESET 0 is 3, C1 and C2 are determined based on CCE indexes.

If nshift mod 48 belongs to {0 to 7}+{32 to 47}, T=0; if nshift mod 48 belongs to {8, 31}, T=1;
C1=32+T; C2=17-T.

A range of CCE resources used by the control channels of the REDCAP UE is: C1, C1+2, . . . , C1+14; and C2, C2+2, . . . , C2+14; or C1, C1+2, . . . , C1+14; and C2-16, . . . , C2-2, C2, C2+2, . . . , C2+14. A corresponding frequency domain range is determined based on candidate control channels defined for the REDCAP UE.

Figure 2K:
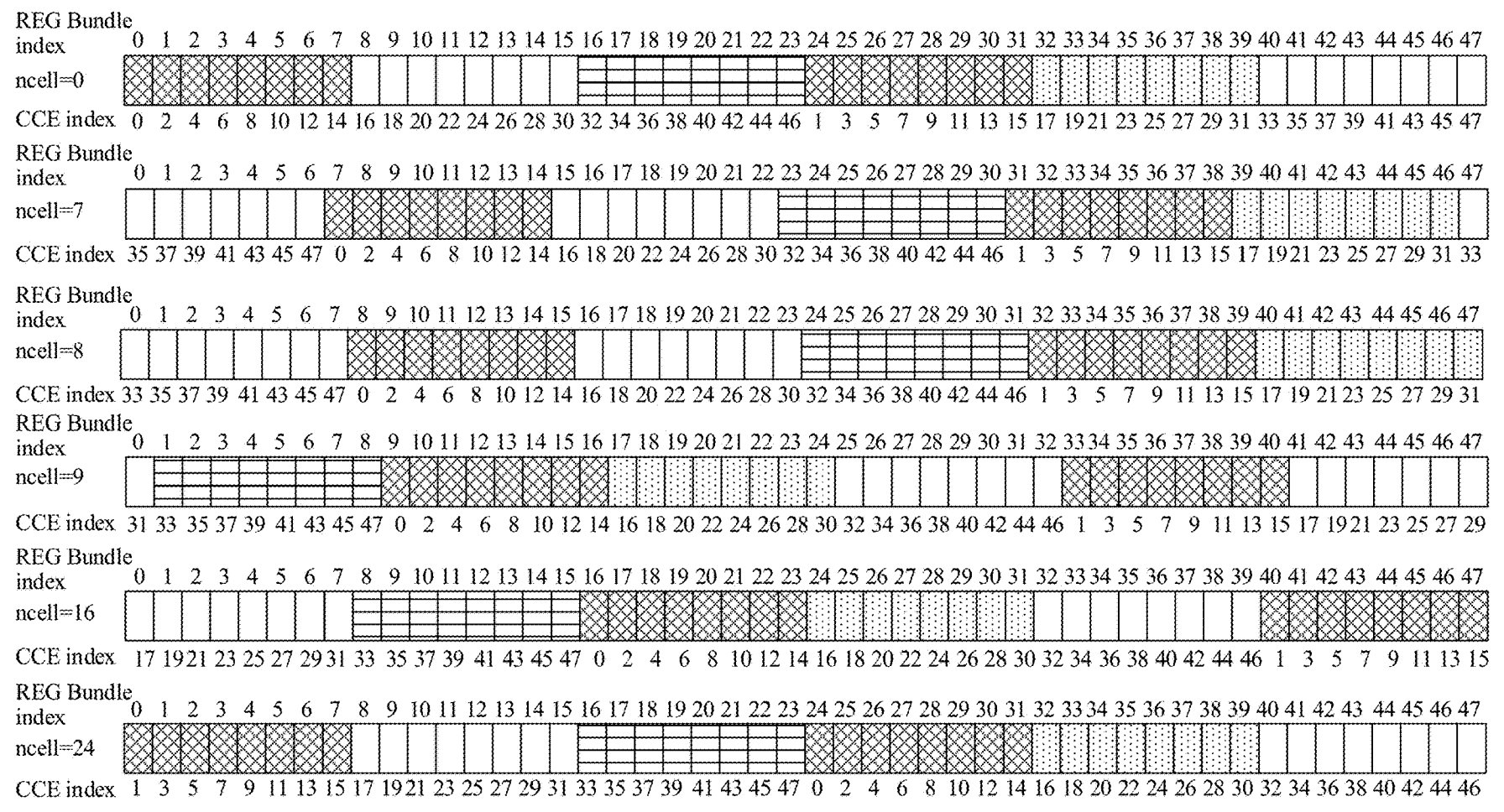

As shown in FIG. 2k, resources that can be used by the REDCAP UE include: candidate control channels shown by horizontal line grids and candidate control channels shown by dotted grids, and each index below the CORESET 0 corresponds to a CCE.

When nshift=0, nshift=7, and nshift=48, C1=32 and C2=17.

When nshift=8, nshift=9, nshift=16, and nshift=24, C1=33 and C2=16.

In addition, when nshift=8, it may be alternatively that: T=0; C1=32; and C2=17.

Figures 2L, 2M:
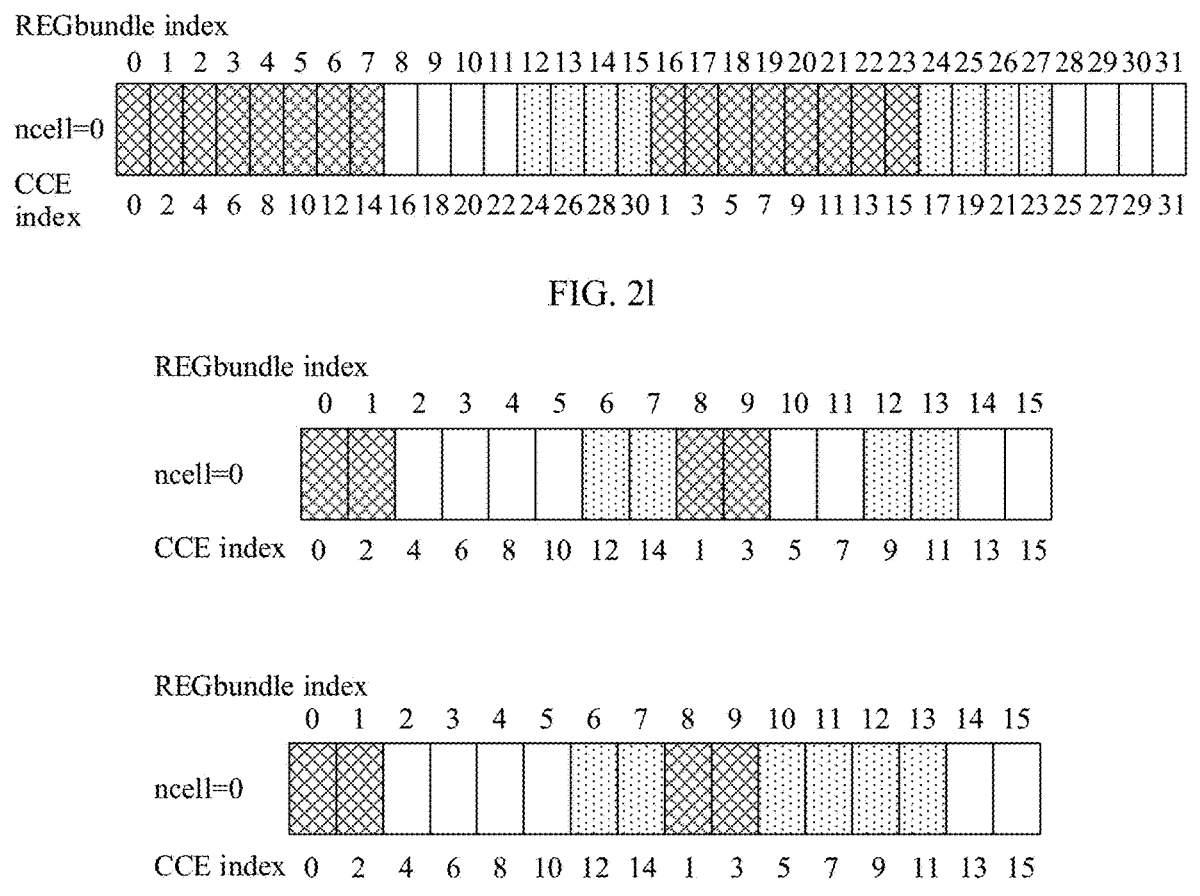

(2) As shown in FIG. 2l, resources that can be used by the REDCAP UE include: candidate control channels shown by dotted grids. When a total quantity of RBs occupied by the CORESET 0 is 96, and the quantity of symbols occupied by the CORESET 0 is 2, if nshift mod 32 belongs to {0 to 3}+{20 to 31}, T=0; and if nshift mod 32 belongs to {4, 19}, T=1; C1=24+T; and C2=17-T.

A range of CCE resources used by the control channels of the REDCAP UE is: C1, C1+2, . . . , C1+6; and C2, C2+2, . . . , C2+6; or C1, C1+2, . . . , C1+6; and C2-16, . . . , C2-2, C2, C2+2, . . . , C2+6. A corresponding frequency domain range is determined based on candidate control channels defined for the REDCAP UE.

(3) As shown in FIG. 2m, resources that can be used by the REDCAP UE include: candidate control channels shown by dotted grids. When a total quantity of RBs occupied by the CORESET 0 is 96, and the quantity of symbols occupied by the CORESET 0 is 1, if nshift mod 16 belongs to {0 to 1}+{10 to 15}, T=0; and if nshift mod 16 belongs to {2, 9}, T=1; C1=12+T; and C2=9-T.

A range of CCE resources used by the control channels of the REDCAP UE is: C1, C1+2; and C2, C2+2; or C1, C1+2, . . . , C1+6; and C2-8, . . . , C2-2, C2, C2+2, . . . , C2+6. A corresponding frequency domain range is determined based on candidate control channels defined for the REDCAP UE.

Based on the foregoing analysis, it can be learned that, if nshift mod M belongs to {$2^1$ to $2^{l-u}$+M/2−1}, T=1; or otherwise, T=0.
C1=2N1+T; C2=2N2+1-T;
N1=(M/2-$2^l$); N2=M/2-$2^{l+1}$.

M is a quantity of REGbundles or a quantity of CCEs. 1 is the quantity of symbols occupied by the coreset; nshift=ncellID.

Available CCEs are C1, C1+2, . . . , C1+(M/4−1)*2; and C2, C2+2, . . . , C2+(M/4−1)*2, where * represents multiplication, M/4 represents M divided by 4, and M/4 has the same meaning as M/4.

Alternatively, in C1, C1+2, . . . , C1+(M/4−1)*2; and C2−(C2 mod 2), . . . , C2−2, C2, C2+2, . . . , C2+(M/4−1)*2, a corresponding frequency domain range is determined based on candidate control channels defined for the RED-CAP UE.

Figure 2N:
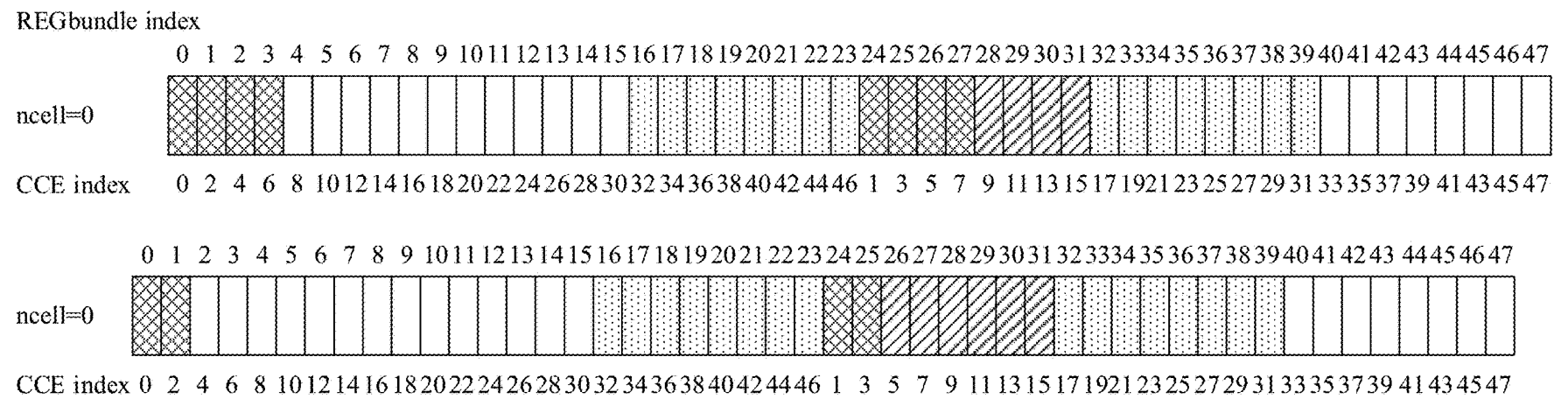

As shown in FIG. 2n, resources that can be used by the REDCAP UE include candidate control channels shown by dotted grids, and resources of the REDCAP UE are mapped when an AL of the legacy UE is 16 (16 CCE resources are occupied). If a quantity of resources of the legacy UE decreases, for example, AL=8 or 4, the available resources of the REDCAP UE increase, and a part of yellow grids in the following figure may be occupied.

For the REDCAP UE, the following mapping rule between REGbundles and CCEs is defined: If interleaving is not performed, the legacy UE complies with a current interleaved mapping rule, the REDCAP UE does not perform interleaving on resources, and performs corresponding mapping between the CCEs and the REGs in the foregoing resource range. For example, the CCEs and the REGbundles are arranged in an order. Alternatively, CCE index=REGbundle index+offset, or mapping is performed between two indexes based on an offset. The offset may be determined to be fixed. For example, fixed values are preset for different quantities of frequency domain resources and different quantities of symbols, or calculation is performed according to a rule, for example, offsets are arranged based on bandwidth/4. Alternatively, the first (or the last) REGbundle index corresponds to a CCE 0.

By using the foregoing examples for description, this embodiment of this application may be used to determine an index of a control channel resource of the REDCAP UE, so that the UE determines the control channel resource. Current control channel determining methods are all for the legacy UE, and a case in which the legacy UE and the REDCAP UE coexist is not considered.

Embodiment 2

Figure 2O:
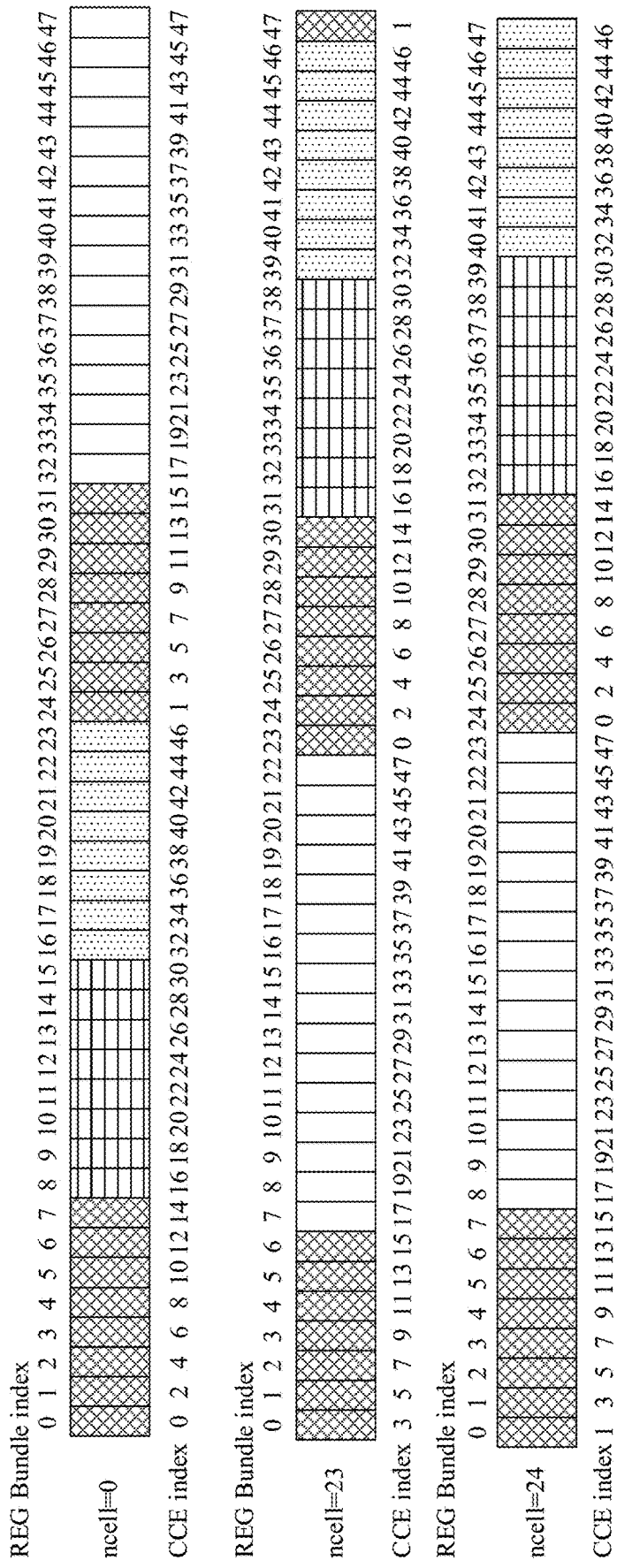
Figures 2P, 2Q:

In the resource mapping manner 2, as shown in FIG. 2o and FIG. 2p, resources of the REDCAP UE are consecutive. For details of determining resources by using REGbundle indexes and CCE indexes, refer to the following method 3 and method 4.

Method 3

In the mapping manner 2, a resource is determined based on a REGbundle index.

(1) When a total quantity of RBs occupied by the CORESET 0 is 96, and the quantity of symbols occupied by the CORESET 0 is 3, for the REDCAP UE, resources used by control channels are determined based on REGbundles (that is, a case in which no interleaving is performed): S1 is the first bundle index in the REGbundles, S1=nshift mod 24+8, and a range of REGbundles used by the control channels of the REDCAP UE is: S1, S1+1, . . . , S1+15. Alternatively, S1=nshift mod 24.

A range of REGbundles used by the control channels of the REDCAP UE is: S1, S1+1, . . . , S1+23. A corresponding frequency domain range is determined based on candidate control channels defined for the REDCAP UE.

(2) As shown in FIG. 2q, resources that can be used by the REDCAP UE include: candidate control channels shown by dotted grids. When a total quantity of RBs occupied by the CORESET 0 is 96, and the quantity of symbols occupied by the CORESET 0 is 2, S1=nshift mod 16+8, and a range of REGbundles used by the control channels of the REDCAP UE is: S1, S1+1, . . . , S1+8; or S1=nshift mod 16.

A range of REGbundles used by the control channels of the REDCAP UE is: S1, S1+1, . . . , S1+16. A corresponding frequency domain range is determined based on candidate control channels defined for the REDCAP UE.

Figure 2R:
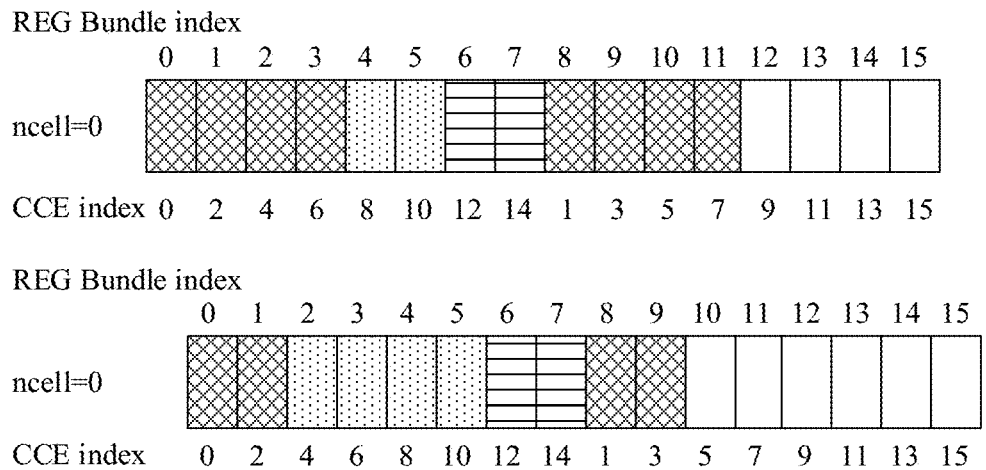

(3) As shown in FIG. 2r, resources that can be used by the REDCAP UE include: candidate control channels shown by dotted grids. When a total quantity of RBs occupied by the CORESET 0 is 96, and the quantity of symbols occupied by the CORESET 0 is 1, S1={nshift} mod 8+4. A range of REGbundles used by the control channels of the REDCAP UE is: S1, S1+1, . . . , S1+4; or S1-nshift mod 8. A range of REGbundles used by the control channels of the REDCAP UE is: S1, S1+1, . . . , S1+8. A corresponding frequency domain range is determined based on candidate control channels defined for the REDCAP UE.

Figure 2S:
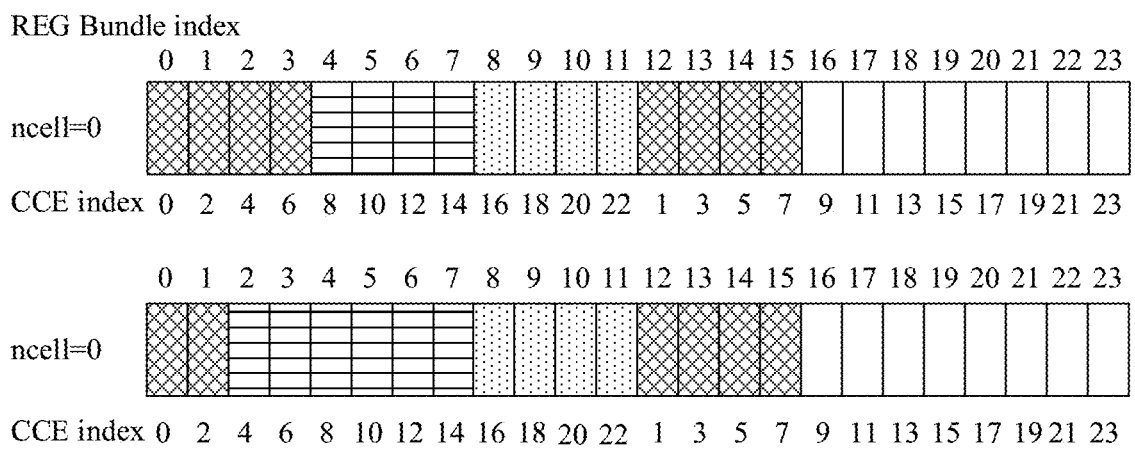

(4) When a total quantity of RBs occupied by the CORESET 0 is 48, and the quantity of symbols occupied by the CORESET 0 is 3, as shown in FIG. 2s, resources that can be used by the REDCAP UE include: candidate control channels shown by dotted grids.

Figure 2T:
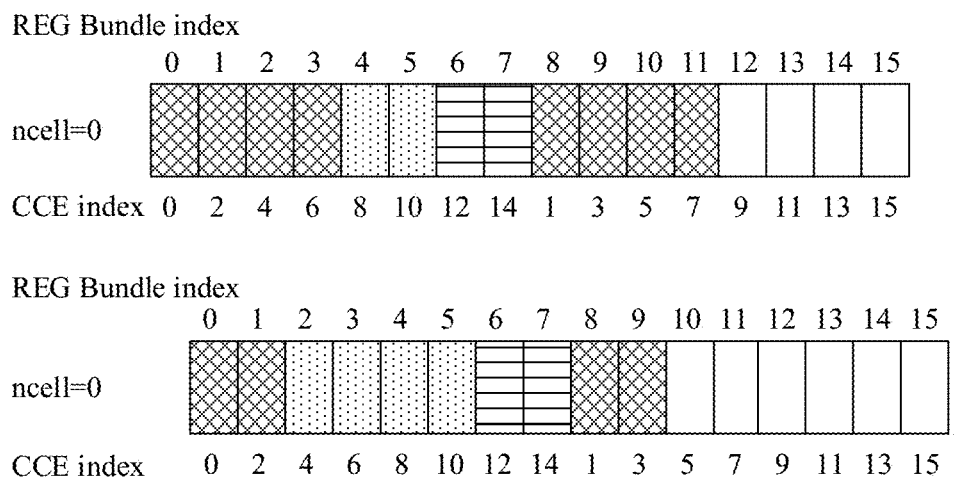

(5) When a total quantity of RBs occupied by the CORESET 0 is 48, and the quantity of symbols occupied by the CORESET 0 is 2, as shown in FIG. 2t, resources that can be used by the REDCAP UE include: candidate control channels shown by dotted grids.

Figure 2U:
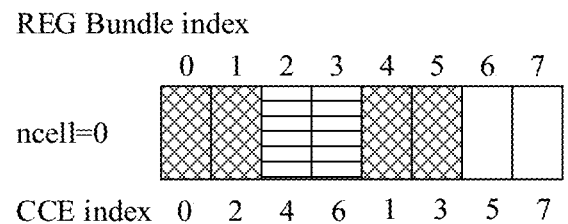

(6) When a total quantity of RBs occupied by the CORESET 0 is 48, and the quantity of symbols occupied by the CORESET 0 is 1, as shown in FIG. 2u, resources that can be used by the REDCAP UE include: candidate control channels shown by dotted grids.

Based on the foregoing analysis, it can be learned that S1={nshift} mod (M/2)+N, M is the quantity of REGbundles, or the quantity of CCEs. 1 is the quantity of symbols occupied by the coreset. $N=(M/2-2^{j+1})$. Available REGbundles are S1, S1+1, . . . , S1+M/2−1; or S1=nshift mod (M/2).

A range of CCE resources used by the control channels of the REDCAP UE is: S1, S1+1, . . . , S1+M/2−1. A corresponding frequency domain range is determined based on candidate control channels defined for the REDCAP UE.

For example, when the total quantity of RBs occupied by the CORESET 0 is 96, and the quantity of symbols occupied by the CORESET 0 is 1, the following manner may be alternatively used: S1={nshift+4} mod 8, or S1={nshift+4} mod 12. Alternatively, the last bundle index in the available REGbundles is determined based on REGbundle indexes. S1={nshift+4} mod 12+3; or, S1={nshift+4} mod 8+3; or, S1={nshift} mod 8+7.

Method 4:

In the mapping manner 2, a resource is determined based on a CCE index.

Figure 2V:
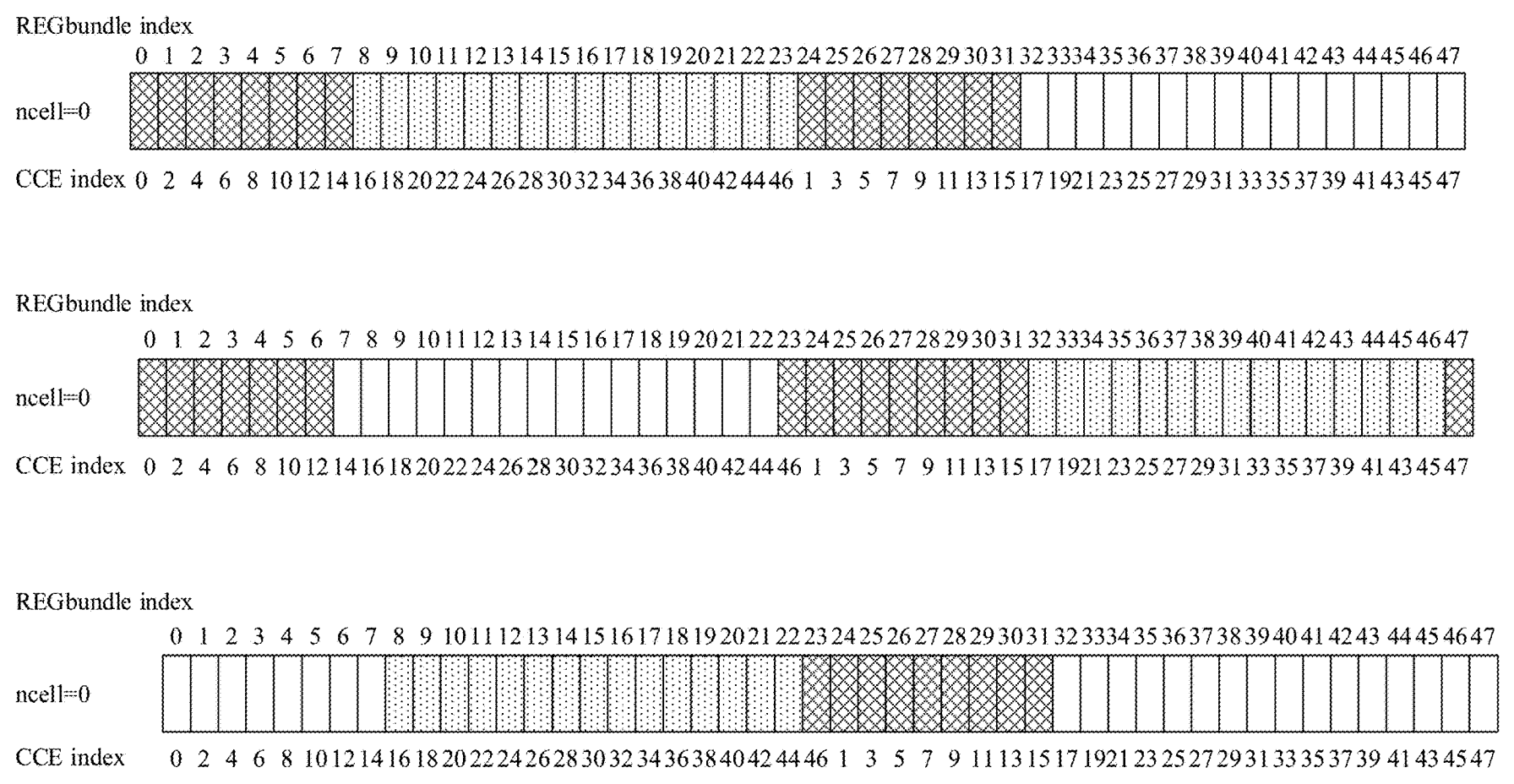

(1) As shown in FIG. 2v, resources that can be used by the REDCAP UE include: candidate control channels shown by dotted grids. When a total quantity of RBs occupied by the CORESET 0 is 96, and the quantity of symbols occupied by the CORESET 0 is 3, if nshift mod 48 belongs to {0, 23}, T=0; and if nshift mod 48 belongs to {24, 47}, T=1; C1=16+T. Available CCE resources are C1, C1+2, . . . , C1+30, or C1=T.

A range of CCE resources used by the control channels of the REDCAP UE is: C1, C1+2, . . . , C1+30, and a corresponding frequency domain range is determined based on candidate control channels defined for the REDCAP UE.

(2) When a total quantity of RBs occupied by the CORESET 0 is 96, and the quantity of symbols occupied by the CORESET 0 is 2, if nshift mod 32 belongs to {0, 15}, T=0; and if nshift mod 32 belongs to {16, 31}, T=1; C1=16+T. Available CCEs are C1, C1+2, . . . , C1+14, or C1=T.

A range of CCE resources used by the control channels of the REDCAP UE is: C1, C1+2, . . . , C1+14, and a corresponding frequency domain range is determined based on candidate control channels defined for the REDCAP UE.

Figure 2W:
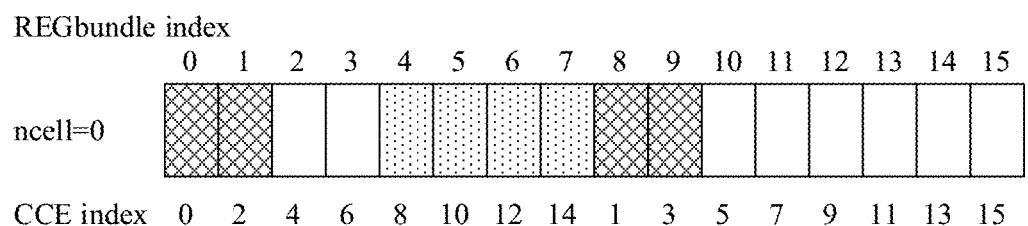
Figure 2W:
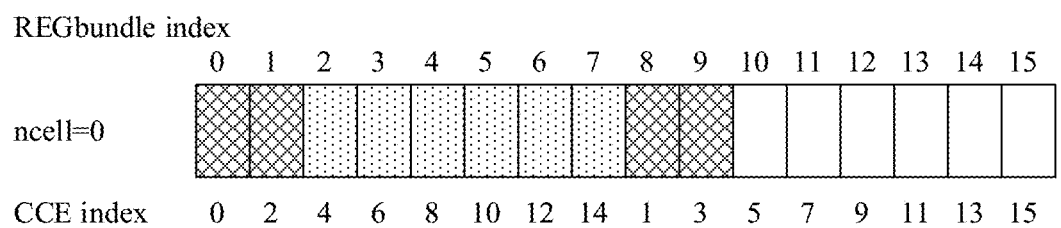

(3) As shown in FIG. 2w, resources that can be used by the REDCAP UE include: candidate control channels shown by dotted grids. When a total quantity of RBs occupied by the CORESET 0 is 96, and the quantity of symbols occupied by the CORESET 0 is 1, if nshift mod 16 belongs to {0, 7}, T=0; and if nshift mod 16 belongs to {8, 15}, T=1; C1=8+T. Available CCEs are C1, C1+2, . . . , C1+6; or C1=T.

A range of CCE resources used by the control channels of the REDCAP UE is: C1, C1+2, . . . , C1+14, and a corresponding frequency domain range is determined based on candidate control channels defined for the REDCAP UE.

Based on the foregoing description, it can be learned that, if nshift mod M belongs to {0 to M/2-1}, T=0; or otherwise, T=0.

C1=2N+T.

N=(M/2−$2^{i+1}$).

M is a quantity of REGbundles or a quantity of CCEs. 1 is the quantity of symbols occupied by the coreset; nshift=ncellID.

Available CCEs are C1, C1+2, . . . , C1+(M−1)*2. Alternatively, C1=T.

A range of CCE resources used by the control channels of the REDCAP UE is: C1, C1+2, . . . , C1+M/2-2. A corresponding frequency domain range is determined based on candidate control channels defined for the REDCAP UE.

By using the foregoing embodiment to describe this application, it can be learned that this embodiment of this application may be used to determine an index of a control channel resource of the REDCAP UE, so that the UE determines the control channel resource. Current control channel determining solutions are all for the legacy UE, and a case in which the legacy UE and the REDCAP UE coexist is not considered.

Embodiment 1 and Embodiment 2 describe two resource mapping methods. A resource range of the CORESET of the REDCAP UE changes with nshift. The following describes, by using examples, a method in which the resource range of the CORESET of the REDCAP UE does not change with nshift.

It is assumed that a shift of the legacy UE in frequency domain is nshift. A total quantity of resources included in frequency domain is BW_num, and the resources may be bandwidth of the CORESET, bandwidth of a BWP, bandwidth supported by the UE, and the like.

In a scenario in which the REDCAP UE supports ½ CORESET bandwidth, a frequency domain resource location of a candidate control channel is determined in the following manner. If REGbundles are mapped to a low frequency part in the CORESET, a location of a maximum value index_h of the REGbundle index is a location of a center of a frequency band, that is, index1_h=[BW_num/2]. A location of a minimum value index1_l of the REGbundle index is a start location of the frequency band, that is, REGbundle index=0. A specific value is related to a shift. If the REGbundles are mapped to a high frequency part in the CORESET, a location of a maximum value index2_h of the index is an end location of the frequency band, that is, index2_h=BW_num-1; and a location of a minimum value index2_l of the index is a location of a center of the frequency band. A specific value is related to a shift, that is, index2_l=[BW_num/2]; or index2_l=index1_h+1.

A quantity of available resources (that is, logical consecutive resources) of the high frequency band or the low frequency band is a maximum AL that can be supported or the maximum AL is matched based on the quantity. A frequency domain resource location of a candidate control channel of the REDCAP UE and an actual quantity of physical resource sections of the REDCAP UE are determined based on one or more of a candidate control channel resource location, an AL, bandwidth of the CORESET 0, and a shift value of the legacy UE. Locations of candidate control channels with other ALs are determined based on minimum impact on the legacy UE. The quantity of the candidate control channels is less than the quantity of candidate control channels with the same AL of the legacy UE.

That a resource of the CORESET of the REDCAP UE may occupy a resource of the low frequency band, or may occupy a resource of the high frequency band is not limited. If the low frequency band is occupied, a resource pattern is the foregoing resource pattern (pattern)+0; or if the high frequency band is occupied, the resource pattern is the foregoing resource pattern (pattern)+CCE_num/2.

Figure 2X:
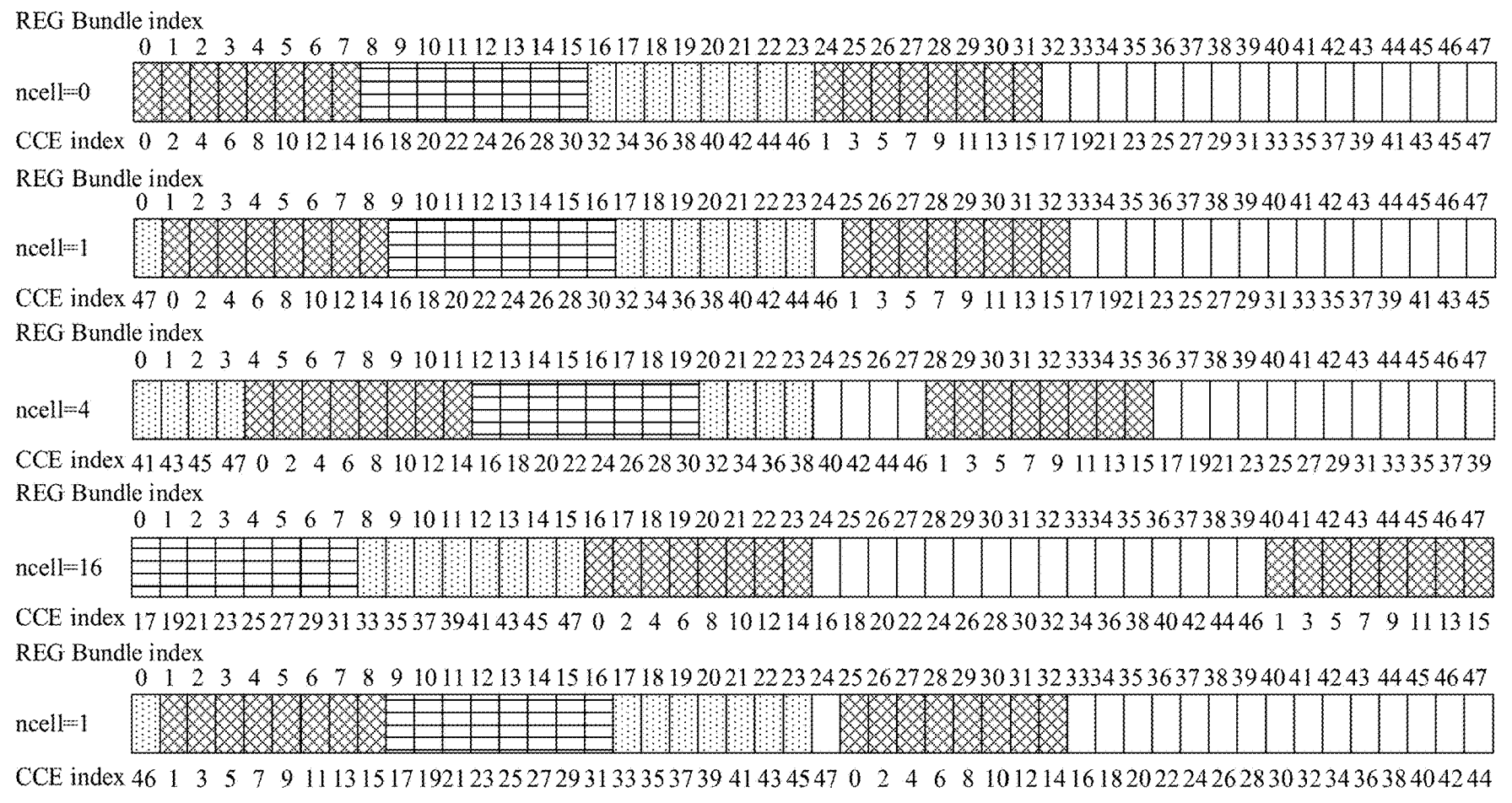

For example, ALs of the legacy UE and the REDCAP UE are both 16, and quantities of candidate control channels of the legacy UE and the REDCAP UE are both 1. A range of available resources is shown in FIG. 2x. Resources that can be used by the REDCAP UE include: candidate control channels shown by dotted grids. For different shift cases of the legacy UE, there are a plurality of resource ranges of the REDCAP UE in the low frequency band, such as the candidate control channels shown by the dotted grids in FIG. 2x.

Next, a case in which the quantity N of resource blocks of the first control resource set is equal to 96 and the quantity 1 of symbols of the first control resource set is equal to 3 (96 RB*3 OS for short) is described in detail.

As shown in FIG. 2y, resources that can be used by the REDCAP UE include: candidate control channels shown by dotted grids. If nshift mod 48 belongs to {1, 16}, C1=W+1-(nshift mod 48)*2, Y=nshift mod 16, C2=16/12, and M=16/20. If nshift mod 48 belongs to {25, 40}, C1=W−(nshift mod 48)*2, Y=nshift mod 16, C2=17/13, N2=nshift mod 24, and M=16/20. If nshift mod 48 belongs to {17, 24}, C1=17, and M=16/20.

In other cases, C1=17, Y=nshift mod 16, C2=W−1−N2*2, N2=nshift mod 24, and M=16/20.

Next, a case in which the quantity N of resource blocks of the first control resource set is equal to 96 and the quantity 1 of symbols of the first control resource set is equal to 2 (96 RB*2 OS for short) is described in detail. If nshift mod 16 belongs to {1, 8}, i=0, Y=nshift mod 16, X=8/4(/0), and M=8/12. In other cases, i=(nshift+8/4 mod) 16, X=0, and M=8/12.

Next, a case in which the quantity N of resource blocks of the first control resource set is equal to 96 and the quantity 1 of symbols of the first control resource set is equal to 1 (96 RB*1 OS for short) is described in detail. If nshift mod 8 belongs to {1, 4}, i=0, Y=nshift mod 8, X=4/2(/0), and M=4/6. In other cases, i=(nshift+4/2 mod) 8, X=0, and M=4/6.

Next, a case in which the quantity N of resource blocks of the first control resource set is equal to 96 and the quantity 1 of symbols of the first control resource set is equal to 3 (96 RB*3OS for short) is described in detail. If nshift mod 24 belongs to {1, 16}, i=0, Y=nshift mod 24, X=8/4(/0), and M=16/20. In other cases, i=(nshift+8/4 mod) 24, X=0, and M=16/20.

Next, a case in which the quantity N of resource blocks of the first control resource set is equal to 96 and the quantity 1 of symbols of the first control resource set is equal to 2 (96 RB*2 OS for short) is described in detail. If nshift mod 16 belongs to {1, 8}, i=0, Y=nshift mod 16, X=8/4(/0), and M=8/12. In other cases, i=(nshift+8/4 mod) 16, X=0, and M=8/12.

Next, a case in which the quantity N of resource blocks of the first control resource set is equal to 96 and the quantity 1 of symbols of the first control resource set is equal to 1 (96 RB*1 OS for short) is described in detail. If nshift mod 8 belongs to {1, 4}, i=0, Y=nshift mod 8, X=4/2(/0), and M=4/6. In other cases, i=(nshift+4/2 mod) 8, X=0, and M=4/6. If nshift mod W/2 belongs to {1, 4}, i=0, Y=nshift mod W/2, X=X=W/2$^{l-u+1}$ or X=[W/2$^{l-u+1}$]/2. In other cases, i=(nshift+Z mod) W/2, and X=0.

Further, patterns of different frequency domains (high and low frequencies) may support frequency hopping, for example, frequency hopping in a plurality of slots. For example, a slot 0 is in a low frequency band, and a slot 1 is in a high frequency band.

The AL of the UE may be bandwidth occupied by one hop, for example, a low/high frequency band; or may be bandwidth occupied by a plurality of hops. For example, a part of the AL is sent at a low frequency band at a moment 1, and another part of the AL is sent at a high frequency band at a moment 2. In this way, the first terminal device obtains a diversity gain of a full frequency band by switching between a high frequency band and a low frequency band within the bandwidth of the CORESET 0 by using two slots.

Whether the REDCAP UE supports frequency hopping is determined according to a signaling indication or a rule. The rule may be determined based on system bandwidth and bandwidth that is supported by the UE.

Figure 2Z:
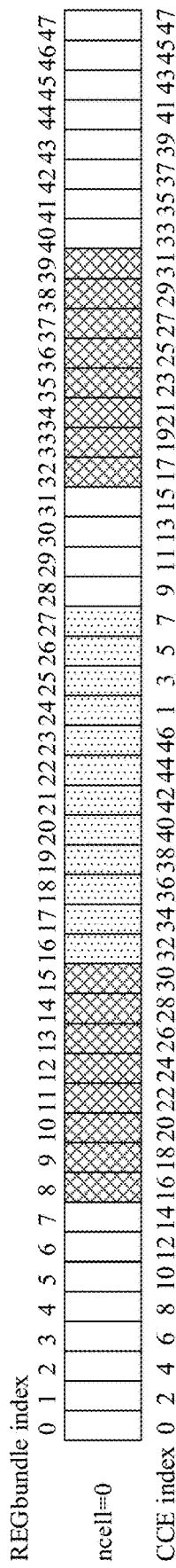
Figure 2Z:
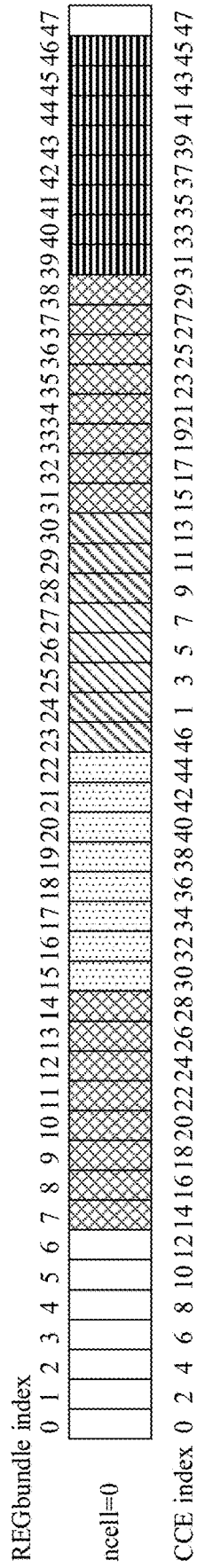
Figure 2Z:
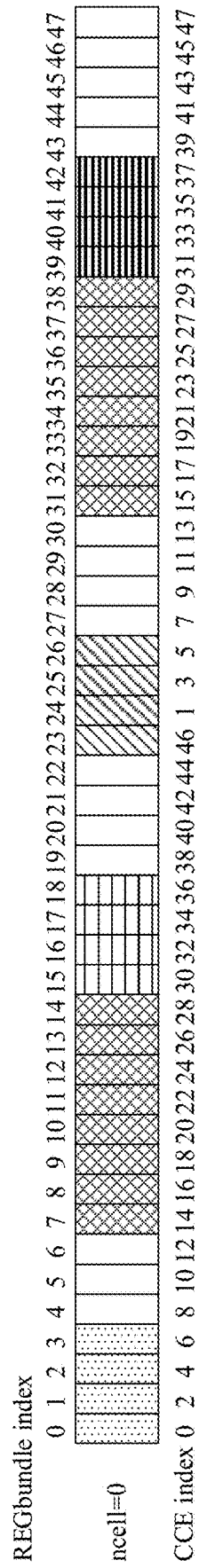

The following describes a scenario in which the REDCAP UE supports 1/4 CORESET bandwidth. As shown in FIG. 2z, resources that can be used by the REDCAP UE include candidate control channels shown by dotted grids, one resource pattern when AL=12 can be supported. Frequency hopping is not supported/frequency domain locations in two slots are the same.

As shown in FIG. 2za, resources that can be used by the REDCAP UE include: candidate control channels shown by dotted grids. Three patterns when AL=8 can be supported. However, to be within the same bandwidth as AL=12 of the UE, only one pattern can be supported when AL=8. Frequency hopping is not supported.

As shown in FIG. 2zb, resources that can be used by the REDCAP UE include: candidate control channels shown by dotted grids. Four patterns when AL=4 can be supported. However, to be within the same bandwidth as AL=12 of the UE, only two patterns can be supported when AL=4.

By using the foregoing examples for description, this embodiment of this application provides a method for determining an index of a control channel resource of REDCAP UE, so that the UE determines the control channel resource. Current control channel determining solutions are applicable only to a conventional terminal device, and a case in which the conventional terminal device and the REDCAP UE coexist is not considered. Embodiments of this application provide three resource mapping manners. In the manner 1 and the manner 2, control channel resources are determined by using REGbundle indexes and CCE indexes separately. In the manner 3, a CORESET resource mapping manner that can support frequency hopping is introduced, to be specific, resources are mapped to logical consecutive resources in a high frequency band or a low frequency band, and whether the NRL UE supports frequency hopping is determined by signaling indication or according to a rule. In addition, in embodiments of this application, when it is determined that the REDCAP UE and the legacy UE are in a same CORESET, a resource location may be further determined while avoiding interference to the legacy UE.

It should be noted that, for brief description, the foregoing method embodiments are described as a series of action combinations. However, a person skilled in the art should understand that embodiments of this application are not limited to the described action sequences, because according to embodiments of this application, some operations may be performed in another sequence or performed at the same time. In addition, a person skilled in the art should also understand that embodiments described in this specification all belong to preferred embodiments, and the involved actions and modules are not necessarily mandatory by this application.

To better implement the solutions of embodiments of this application, a related apparatus for implementing the solutions is further provided below.

Figure 3:
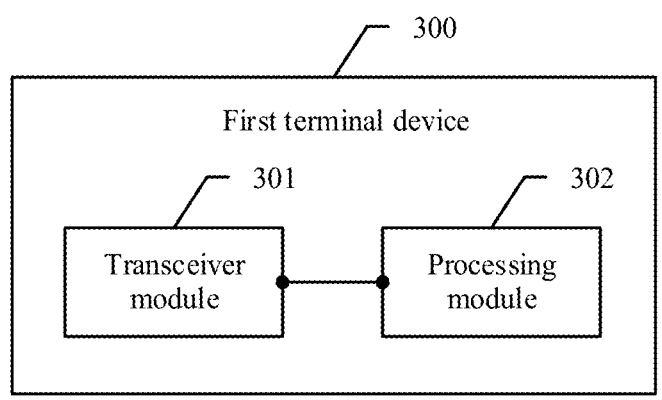
FIG. 3 is a schematic diagram of a composition structure of a terminal device according to an embodiment of this application.

FIG. 3 shows a communications apparatus according to an embodiment of this application. The communications apparatus may be a first terminal device, or an apparatus in the first terminal device, or an apparatus that can be used in cooperation with the first terminal device. FIG. 3 is shown by using an example in which the communications apparatus is a first communications apparatus, and the first communications apparatus is specifically a first terminal device 300. The first terminal device 300 may include a transceiver module 301 and a processing module 302.

In an embodiment:

the transceiver module is configured to receive first information from a second communications apparatus, where the first information is used to indicate a first control resource set, a quantity of resource blocks of the first control resource set is N, a quantity of resource element group bundles REGbundles of the first control resource set is W, and bandwidth supported by the first communications apparatus is less than bandwidth corresponding to the N resource blocks, and N and W are positive integers; the processing module is configured to monitor a first control channel on M REGbundles in the W REGbundles, where M is less than W, indexes {i, i+1, . . . , i+(Y−1)} of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first communications apparatus, i, Y, and X are values determined by the first communications apparatus, M and Y are positive integers, and i and X are integers greater than or equal to 0; or, the processing module is configured to monitor the first control channel on M control channel element CCE resources corresponding to the M REGbundles in the W REGbundles, where M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or, indexes of the M CCE resources in the M CCE resources are {C1, C1+2, . . . , C1+(M−1)×2}; M represents the quantity of the available REGbundles of the first communications apparatus, C1, C2, Y, and X are values determined by the first communications apparatus, M and Y are positive integers, and C1 and C2 are integers greater than or equal to 0.

Figure 4:
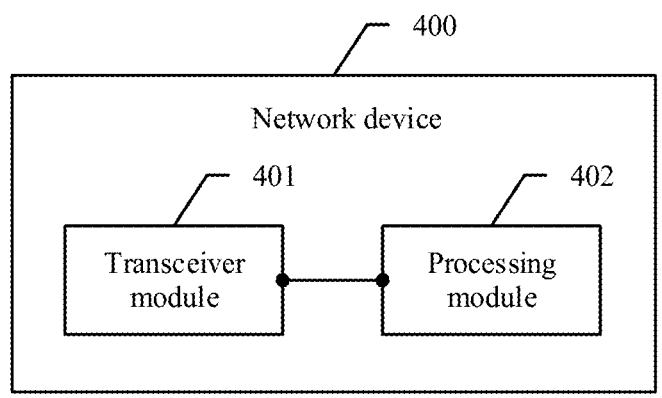
FIG. 4 is a schematic diagram of a composition structure of a network device according to an embodiment of this application.

FIG. 4 shows a communications apparatus according to an embodiment of this application. The communications apparatus may be a network device, or an apparatus in the network device, or an apparatus that can be used in cooperation with the network device. FIG. 4 is shown by using an example in which the communications apparatus is a network device 400. The network device 400 may include a transceiver module 401 and a processing module 402.

In an embodiment:

the processing module is configured to send first information to a first communications apparatus by using the transceiver module, where the first information is used to indicate a first control resource set, a quantity of resource blocks of the first control resource set is N, a quantity of resource element group bundles REGbundles of the first control resource set is W, and bandwidth supported by the first communications apparatus is less than bandwidth corresponding to the N resource blocks, and N and W are positive integers; the processing module is configured to send a first control channel on M REGbundles in the W REGbundles by using the transceiver module, where M is less than W, indexes $\{i, i+1, \ldots, i+(Y-1)\}$ of Y REGbundles in the M REGbundles are consecutive, indexes $\{i+(Y+X), i+(Y+X+1), \ldots, i+(M-1+X)\}$ of remaining (M−Y) REGbundles in the M REGbundles are consecutive, M represents a quantity of available REGbundles of the first communications apparatus, i, Y, and X are values determined by the first communications apparatus, M and Y are positive integers, and i and X are integers greater than or equal to 0; or, the processing module is configured to send the first control channel on M control channel element CCE resources corresponding to the M REGbundles in the W REGbundles by using the transceiver module, where M is less than W, indexes of Y CCE resources in the M CCE resources are $\{C1, C1+2, \ldots, C1+(Y-1)\times 2\}$, and indexes of remaining (M−Y) CCE resources in the M CCE resources are $\{C2, C2+2, \ldots, C2+(M-Y-1)\times 2\}$; or, indexes of the M CCE resources in the M CCE resources are $\{C1, C1+2, \ldots, C1+(M-1)\times 2\}$; M represents the quantity of the available REGbundles of the first communications apparatus, C1, C2, Y, and X are values determined by the first communications apparatus, M and Y are positive integers, and C1 and C2 are integers greater than or equal to 0.

In an embodiment, i is determined based on one or more of the bandwidth supported by the first communications apparatus, a quantity l of symbols included in the first control resource set, N, W, a subcarrier spacing, a frequency range, a cell identifier, a radio frame number, a subframe number, and a slot number; and/or, Y is determined based on one or more of the bandwidth supported by the first communications apparatus, the quantity l of symbols, N, W, the subcarrier spacing, the frequency range, the cell identifier, the radio frame number, the subframe number, and the slot number; and/or, X is determined based on one or more of the bandwidth supported by the first communications apparatus, the quantity l of symbols, N, W, the subcarrier spacing, the frequency range, the cell identifier, the radio frame number, the subframe number, and the slot number; and/or, C1 is determined based on one or more of the bandwidth supported by the first communications apparatus, the quantity l of symbols, N, W, the subcarrier spacing, the frequency range, the cell identifier, the radio frame number, the subframe number, and the slot number; and/or, C2 is determined based on one or more of the bandwidth supported by the first communications apparatus, the quantity l of symbols, N, W, the subcarrier spacing, the frequency range, the cell identifier, the radio frame number, the subframe number, and the slot number.

In an embodiment, $i=\{n+Z\} \mod (W/2)$, where n represents an identifier of a cell in which the first communications apparatus is located, $Z=W/2-2^{l-u}$, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter; and/or, $X=W/2-2^{l-u+1}$, where l represents the quantity of symbols included in the first control resource set, and u is the subcarrier spacing parameter; and/or, $X=[W/2-2^{l-u+1}]/2$, where l represents the quantity of symbols included in the first control resource set, and u is the subcarrier spacing parameter; and/or, $X=W/2-2^{l-1}$, where l represents the quantity of symbols included in the first control resource set, and u is the subcarrier spacing parameter.

In an embodiment, $C1=2N1+T$, where $N1=W/2-2^{l-u}$; when a result obtained through n mod W is greater than or equal to $2^{l-u}$ and less than or equal to $2^{l-u}+W/2-1$, T=1; when the result obtained through n mod W is less than $2^{l-u}$ or greater than $2^{l-u}+W/2-1$, T=0, where N represents an identifier of a cell in which the first communications apparatus is located, l represents the quantity of symbols included in the first control resource set, u is a subcarrier spacing parameter, and mod represents a REM operation; and/or, $C2=2N2+1-T$, where $N2=W/2-2^{l-u+1}$, or $N2=(W/2-2^{l-u+1})/2$; when the result obtained through n mod W is greater than or equal to $2^{l-u}$ and less than or equal to $2^{l-u}+W/2-1$, T=1; when the result obtained through n mod W is less than $2^{l-u}$ or greater than $2^{l-u}+W/2-1$, T=0, where n represents the identifier of the cell in which the first communications apparatus is located, l represents the quantity of symbols included in the first control resource set, u is the subcarrier spacing parameter; and/or, $Y=M/2$, or $Y=2^{l-u}$, where l represents the quantity of symbols included in the first control resource set, and u is the subcarrier spacing parameter.

In an embodiment, $i=n \mod (W/2)+Z$, where n represents an identifier of a cell in which the first communications apparatus is located, $Z=W/2-2^{l-u+1}$, or $Z=[W/2-2^{l-u+1}]/2$, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter; and/or, $X=0$.

In an embodiment, $C1=2N1+T$, where $N1=W/2-2^{l-u+1}$, or $N1=[W/2-2^{l-u+1}]/2$; when a result obtained through n mod W is greater than or equal to 0 and less than or equal to W/2−1, T=0; when the result obtained through n mod W is greater than W/2−1, T=1, where n represents an identifier of a cell in which the first communications apparatus is located, l represents the quantity of symbols included in the first control resource set, u is a subcarrier spacing parameter, and mod represents a REM operation; and/or, $Y=M/2$, or $Y=2^{l-u}$, where l represents the quantity of symbols included in the first control resource set, and u is the subcarrier spacing parameter.

In an embodiment, the processing module is configured to monitor the first control channel in a first resource subset or a second resource set, where i, Y, and X in the first resource subset satisfy the following feature: When a result obtained through n mod W/2 is greater than or equal to 1 and less than or equal to $2^{i+1}$, i=0, where Y=n mod W/2, and X=Z; when the result obtained through n mod W/2 is less than 1 or greater than or equal to $2^{i+1}$, i=(n+Z) mod W/2, and X=0, where Z=W/2−$2^{l−u+1}$, or Z=[W/2−$2^{l−u+1}$]/2, n represents an identifier of a cell in which the first communications apparatus is located, l represents the quantity of symbols included in the first control resource set, u is a subcarrier spacing parameter, and mod represents a REM operation; and/or, i, Y, and X in the second resource subset satisfy the following feature: When the result obtained through n mod W/2 is greater than or equal to 1 and less than or equal to $2^{i+1}$, i=W/2, Y=n mod W/2, and X=Z; when the result obtained through n mod W/2 is less than 1 or greater than or equal to $2^{i+1}$, i=(n+Z) mod W/2+W/2, and X=0, where Z= W/2−$2^{l−u+1}$ or Z=[W/2−$2^{l−u+1}$]/2, n represents the identifier of the cell in which the first communications apparatus is located, l represents the quantity of symbols included in the first control resource set, u is the subcarrier spacing parameter, and mod represents the REM operation.

In an embodiment, the processing module is configured to monitor the first control channel in a first resource subset or a second resource set, where i, Y, and X in the first resource subset satisfy the following feature: When a result obtained through n mod W is greater than or equal to 1 and less than or equal to N, C1=W+1−(n mod W)×2, Y=n mod $2^{i+1}$, and C2=Z; when the result obtained through n mod W is greater than or equal to 1+W/2 and less than or equal to N+W/2, C1=W−(n mod W)×2, Y=n mod $2^{i+1}$, C2=Z+1, and N2=n mod W/2; when the result obtained through n mod W is greater than or equal to N+1 and less than or equal to W/2, C1=Z+1; when the result obtained through n mod W is less than 1 or greater than N+W/2, C1=Z, where N=$2^{i+1}$, Z=W/2−$2^{l−u+1}$ or Z=[W/2−$2^{l−u+1}$]/2, n represents an identifier of a cell in which the first communications apparatus is located, l represents the quantity of symbols included in the first control resource set, u is a subcarrier spacing parameter, and mod represents a REM operation; and/or, i, Y, and X in the second resource subset satisfy the following feature: When the result obtained through n mod W is greater than or equal to 1 and less than or equal to N, C1=W−(N mod W)×2, Y=n mod $2^{i+1}$, and C2=Z+1; when the result obtained through n mod W is greater than or equal to 1+W/2 and less than or equal to N+W/2, C1=W+1−(n mod W)×2, Y=n mod $2^{i+1}$, C2=Z, and N2=n mod W/2; when n mod W is greater than or equal to N+1 and less than or equal to W/2, C1=Z; when n mod W is greater than or equal to 1 and less than or equal to N+W/2, C1=Z+1, where N=$2^{i+1}$, Z=W/2−$2^{l−u+1}$, or Z=[W/2−$2^{l−u+1}$]/2, n represents the identifier of the cell in which the first communications apparatus is located, l represents the quantity of symbols included in the first control resource set, u is the subcarrier spacing parameter, and mod represents the REM operation.

In an embodiment, the processing module is configured to: monitor the first control channel on a resource of the first resource subset in a first time unit and monitor the first control channel on a resource of the second resource subset in a second time unit.

In an embodiment, the processing module is configured to: before receiving the first information, receive second information by using the transceiver module, where the second information indicates the first communications apparatus to monitor the first control channel on a resource of the first control resource set, or monitor the first control channel on a resource set not overlapping the first control resource set.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 5:
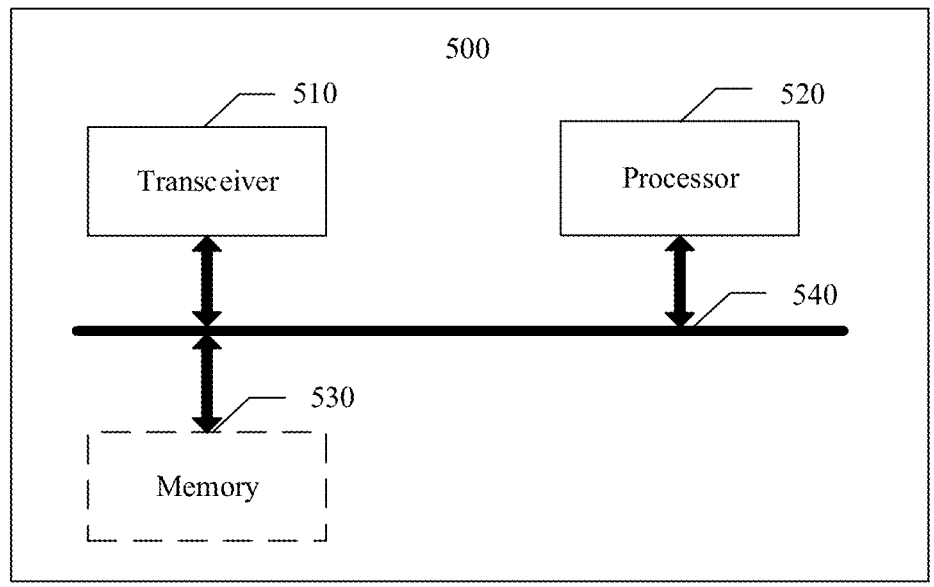
FIG. 5 is a schematic diagram of a composition structure of a terminal device according to an embodiment of this application.

FIG. 5 shows an apparatus 500 provided in an embodiment of this application, and the apparatus 500 is configured to implement a function of the terminal device in the foregoing method. The apparatus may be a terminal device, or an apparatus in the terminal device, or an apparatus that can be used in cooperation with the terminal device. The apparatus may be a chip system. In this embodiment of this application, the chip system may include a chip, or may include the chip and another discrete component. The apparatus 500 includes at least one processor 520, configured to implement the function of the terminal device in the method provided in embodiments of this application. For example, the processor 520 may receive information such as downlink control information or configuration information of a control resource set, and parse the foregoing information. For details, refer to the detailed description in the method example. Details are not described herein.

The apparatus 500 may further include at least one memory 530, configured to store program instructions and/or data. The memory 530 is coupled to the processor 520. The coupling in this embodiment of this application is an indirect coupling or a communication connection between apparatuses, units, or modules in electrical, mechanical, or another form, and is used for information exchange between the apparatuses, the units, or the modules. The processor 520 may cooperate with the memory 530. The processor 520 may execute the program instructions stored in the memory 530. At least one of the at least one memory may be included in the processor.

The apparatus 500 may further include a communications interface. The communications interface has a plurality of implementations. For example, the communications interface may be a transceiver, an interface, a bus, a circuit, a pin, or an apparatus that can implement a transceiver function. In FIG. 5, an example in which the communications interface is a transceiver 510 is used for description. The transceiver 510 is configured to communicate with another device by using a transmission medium, so that an apparatus in the apparatus 500 may communicate with another device. For example, the another device may be a network device. The processor 520 sends and receives data by using the transceiver 510, and is configured to implement the method performed by the terminal device in the embodiment corresponding to FIG. 1.

A specific connection medium between the transceiver 510, the processor 520, and the memory 530 is not limited in this embodiment of this application. In this embodiment of this application, in FIG. 5, the memory 530, the processor 520, and the transceiver 510 are connected by using a bus 540. The bus is indicated by using a thick line in FIG. 5. A connection manner between other components is merely an example for description, and is not limited. The bus may be classified into an address bus, a data bus, a control bus, and the like. For ease of representation, only one bold line is used for representation in FIG. 5, but this does not mean that there is only one bus or only one type of bus.

Figure 6:
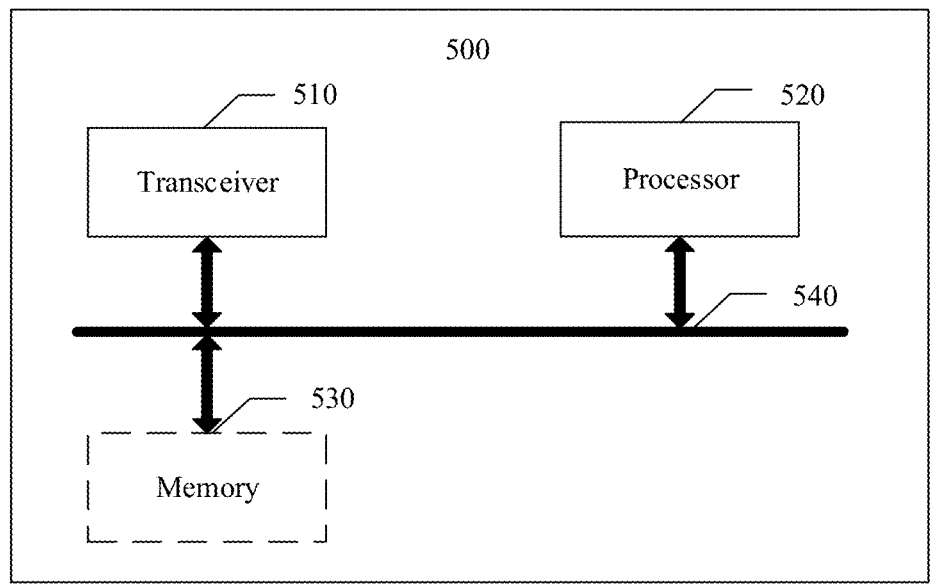
FIG. 6 is a schematic diagram of a composition structure of a network device according to an embodiment of this application.

FIG. 6 shows an apparatus 600 provided in an embodiment of this application, and the apparatus 600 is configured to implement a function of the network device in the foregoing method. The apparatus may be a network device, or an apparatus in the network device, or an apparatus that can be used in cooperation with the network device. The apparatus may be a chip system. The apparatus 600 includes at least one processor 620, configured to implement a function of the network device in the method provided in embodiments of this application. For example, the processor 620 may generate and send information such as downlink control information or configuration information of a control resource set. For details, refer to the detailed description in the method example. Details are not described herein.

The apparatus 600 may further include at least one memory 630, configured to store program instructions and/or data. The memory 630 is coupled to the processor 620. The coupling in this embodiment of this application is an indirect coupling or a communication connection between apparatuses, units, or modules in electrical, mechanical, or another form, and is used for information exchange between the apparatuses, the units, or the modules. The processor 620 may cooperate with the memory 630. The processor 620 may execute the program instructions stored in the memory 630. At least one of the at least one memory may be included in the processor.

The apparatus 600 may further include a communications interface. The communications interface has a plurality of implementations. For example, the communications interface may be a transceiver, an interface, a bus, a circuit, or an apparatus that can implement a transceiver function. In FIG. 6, an example in which the communications interface is a transceiver 66 is used for description. The transceiver 66 is configured to communicate with another device by using a transmission medium, so that an apparatus in the apparatus 600 may communicate with another device. For example, the another device may be a terminal device. The processor 620 sends and receives data by using the transceiver 66, and is configured to implement the method performed by the network device in the embodiment corresponding to FIG. 1.

A specific connection medium between the transceiver 66, the processor 620, and the memory 630 is not limited in this embodiment of this application. In this embodiment of this application, in FIG. 6, the memory 630, the processor 620, and the transceiver 66 are connected by using a bus 640. The bus is indicated by using a thick line in FIG. 6. A connection manner between other components is merely an example for description, and is not limited. The bus may be classified into an address bus, a data bus, a control bus, and the like. For ease of representation, only one bold line is used for representation in FIG. 6, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor, or may be any conventional processor or the like. The operations of the method disclosed with reference to embodiments of this application may be directly performed by a hardware processor, or may be performed by a combination of hardware and software modules in the processor.

In this embodiment of this application, the memory may be a non-volatile memory, for example, a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the technical solutions provided in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, on the premise of no logical contradiction, the embodiments may be mutually referenced. For example, methods and/or terms between the method embodiments may be mutually referenced. For example, functions and/or terms between the apparatus embodiments may be mutually referenced. For example, functions and/or terms between the apparatus embodiments and the method embodiments may be mutually referenced.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, wherein the method is applicable to a first terminal device, and comprises:
receiving first information from a network device, wherein the first information is used to indicate a first control resource set, a quantity of resource blocks of the first control resource set is N, a quantity of resource element group bundles (REGbundles) of the first control resource set is W, and a bandwidth supported by the first terminal device is less than a bandwidth corresponding to the N resource blocks, and N and W are positive integers;
monitoring a first control channel on M REGbundles in the W REGbundles, wherein M is less than W, indexes $\{i, i+1, \ldots, i+(Y-1)\}$ of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first terminal device, i, Y, and X are values determined by the first terminal device, M and Y are positive integers, and i and X are integers greater than or equal to 0; or monitoring the first control channel on M control channel element (CCE) resources corresponding to the M REGbundles in the W REGbundles, wherein M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or indexes of the M CCE resources in the M CCE resources are {C1, C1+2, . . . , C1+(M−1)×2}; and M represents the quantity of the available REGbundles of the first terminal device, C1, C2, Y, and X are values determined by the first terminal device, M and Y are positive integers, and C1 and C2 are integers greater than or equal to 0.

2. The method according to claim 1, wherein i is determined based on one or more of the bandwidth supported by the first terminal device, a quantity 1 of symbols comprised in the first control resource set, N, W, a subcarrier spacing, a frequency range, a cell identifier, a radio frame number, a subframe number, and a slot number; and/or Y is determined based on one or more of the bandwidth supported by the first terminal device, the quantity 1 of symbols, N, W, the subcarrier spacing, the frequency range, the cell identifier, the radio frame number, the subframe number, and the slot number; and/or X is determined based on one or more of the bandwidth supported by the first terminal device, the quantity 1 of symbols, N, W, the subcarrier spacing, the frequency range, the cell identifier, the radio frame number, the subframe number, and the slot number; and/or C1 is determined based on one or more of the bandwidth supported by the first terminal device, the quantity 1 of symbols, N, W, the subcarrier spacing, the frequency range, the cell identifier, the radio frame number, the subframe number, and the slot number; and/or C2 is determined based on one or more of the bandwidth supported by the first terminal device, the quantity 1 of symbols, N, W, the subcarrier spacing, the frequency range, the cell identifier, the radio frame number, the subframe number, and the slot number.

3. The method according to claim 1, wherein
i={n+Z} mod (W/2), wherein n represents an identifier of a cell in which the first terminal device is located, $Z=W/2-2^{l-u}$ represents a quantity of symbols comprised in the first control resource set, u is a subcarrier spacing parameter, and mod represents a REM operation; and/or $Y=M/2$, or $Y=2^{l-u}$, wherein l represents the quantity of symbols comprised in the first control resource set, and u is the subcarrier spacing parameter; and/or $X=W/2-2^{l-u+1}$, wherein l represents the quantity of symbols comprised in the first control resource set, and u is the subcarrier spacing parameter; and/or $X=[W/2-2^{l-u+1}]/2$, wherein l represents the quantity of symbols comprised in the first control resource set, and u is the subcarrier spacing parameter; and/or $X=W/2-2^{l-1}$, wherein l represents the quantity of symbols comprised in the first control resource set, and u is the subcarrier spacing parameter.

4. The method according to claim 1, wherein
C1=2N1+T, wherein $N1=W/2-2^{l-u}$; when a result obtained through n mod W is greater than or equal to $2^{l-u}$ and less than or equal to $2^{l-u}+W/2-1$, T=1; when the result obtained through n mod W is less than $2^{l-u}$ or greater than $2^{l-u}+W/2-1$, T=0, wherein N represents an identifier of a cell in which the first terminal device is located, l represents a quantity of symbols comprised in the first control resource set, u is a subcarrier spacing parameter, and mod represents a REM operation; and/or C2=2N2+1-T, wherein $N2=W/2-2^{l-u+1}$, or $N2=(W/2-2^{l-u+1}/2$; when the result obtained through n mod W is greater than or equal to $2^{l-u}$ and less than or equal to $2^{l-u}+W/2-1$, T=1; when the result obtained through n mod W is less than $2^{l-u}$ or greater than $2^{l-u}+W/2-1$, T=0, wherein n represents the identifier of the cell in which the first terminal device is located, l represents the quantity of symbols comprised in the first control resource set, and u is the subcarrier spacing parameter; and/or $Y=M/2$, or $Y=2^{l-u}$, wherein l represents the quantity of symbols comprised in the first control resource set, and u is the subcarrier spacing parameter.

5. The method according to claim 1, wherein
i=n mod (W/2)+Z, wherein n represents an identifier of a cell in which the first terminal device is located, $Z=W/2-2^{l-u+1}$, or $Z=[W/2-2^{l-u+1}]/2$, wherein l represents the quantity of symbols comprised in the first control resource set, u is a subcarrier spacing parameter, and mod represents a REM operation; and/or $Y=M/2$, or $Y=2^{l-u}$, wherein l represents a quantity of symbols comprised in the first control resource set, and u is the subcarrier spacing parameter; and/or

X=0.

6. The method according to claim 1, wherein
C1=2N1+T, wherein $N1=W/2-2^{l-u+1}$, or $N1=[W/2-2^{l-u+1}]/2$; when a result obtained through n mod W is greater than or equal to 0 and less than or equal to W/2−1, T=0; when the result obtained through n mod W is greater than W/2−1, T=1, wherein n represents an identifier of a cell in which the first terminal device is located, l represents a quantity of symbols comprised in the first control resource set, u is a subcarrier spacing parameter, and mod represents a REM operation; and/or $Y=M/2$, or $Y=2^{l-u}$, wherein l represents the quantity of symbols comprised in the first control resource set, and u is the subcarrier spacing parameter.

7. The method according to claim 1, wherein the monitoring a first control channel comprises: monitoring the first control channel in a first resource subset or a second resource subset, wherein i, Y, and X in the first resource subset satisfy the following feature: When a result obtained through n mod W/2 is greater than or equal to 1 and less than or equal to $2^{l+1}$, i=0, wherein Y=n mod W/2, and X=Z; when the result obtained through n mod W/2 is less than 1 or greater than or equal to $2^{l+1}$, i=(n+Z) mod W/2, and X=0, wherein $Z=W/2-2^{l-u+1}$, or $Z=[W/2-2^{l-u+1}]/2$, n represents an identifier of a cell in which the first terminal device is located, l represents a quantity of symbols comprised in the first control resource set, u is a subcarrier spacing parameter, and mod represents a REM operation; and/or i, Y, and X in a second resource subset satisfy the following feature: When the result obtained through n mod W/2 is greater than or equal to 1 and less than or equal to $2^{l+1}$, i=W/2, Y=n mod W/2, and X=Z; when the result obtained through n mod W/2 is less than 1 or greater than or equal to $2^{l+1}$, i=(n+Z) mod W/2+W/2, and X=0, wherein $Z=W/2-2^{l-u+1}$ or $Z=[W/2-2^{l-u+1}]/2$, n represents the identifier of the cell in which the first terminal device is located, l represents the quantity of symbols comprised in the first control resource set, u is the subcarrier spacing parameter, and mod represents the REM operation.

8. The method according to claim 1, wherein
the monitoring a first control channel comprises: monitoring the first control channel in a first resource subset or a second resource set, wherein
i, Y, and X in the first resource subset satisfy the following feature: When a result obtained through n mod W is greater than or equal to 1 and less than or equal to N, C1=W+1-(n mod W)×2, Y=n mod $2^{l+1}$, and C2=Z; when the result obtained through n mod W is greater than or equal to 1+W/2 and less than or equal to N+W/2, C1=W-(n mod W)×2, Y=n mod $2^{l+1}$, C2=Z+1, and N2=n mod W/2; when the result obtained through n mod W is greater than or equal to N+1 and less than or equal to W/2, C1=Z+1; when the result obtained through n mod W is less than 1 or greater than N+W/2, C1=Z, wherein $N=2^{l+1}$, $Z=W/2-2^{l-u+1}$ or $Z=[W/2-2^{l-u+1}]/2$, n represents an identifier of a cell in which the first terminal device is located, l represents a quantity of symbols comprised in the first control resource set, u is a subcarrier spacing parameter, and mod represents a REM operation; and/or
i, Y, and X in a second resource subset satisfy the following feature: When the result obtained through n mod W is greater than or equal to 1 and less than or equal to N, C1=W-(N mod W)×2, Y=n mod $2^{l+1}$, and C2=Z+1; when the result obtained through n mod W is greater than or equal to 1+W/2 and less than or equal to N+W/2, C1=W+1-(n mod W)×2, Y=n mod $2^{l+1}$, C2=Z, and N2=n mod W/2; when n mod W is greater than or equal to N+1 and less than or equal to W/2, C1=Z; when n mod W is greater than or equal to 1 and less than or equal to N+W/2, C1=Z+1, wherein $N=2^{l+1}$, $Z=W/2-2^{l-u+1}$, or $Z=[W/2-2^{l-u+1}]/2$, n represents the identifier of the cell in which the first terminal device is located, l represents the quantity of symbols comprised in the first control resource set, u is the subcarrier spacing parameter, and mod represents the REM operation.

9. The method according to claim 8, wherein the monitoring the first control channel in a first resource subset or a second resource set comprises:
monitoring the first control channel on a resource of the first resource subset in a first time unit and monitoring the first control channel on a resource of the second resource subset in a second time unit.

10. The method according to claim 1, wherein the method further comprises:
receiving, by the first terminal device, second information before receiving the first information, wherein the second information indicates the first terminal device to monitor the first control channel on a resource of the first control resource set, or monitor the first control channel on a resource set not overlapping the first control resource set.

11. A communication method, wherein the method is applicable to a network device, and comprises:
sending first information to a first terminal device, wherein the first information is used to indicate a first control resource set, a quantity of resource blocks of the first control resource set is N, a quantity of resource element group bundles (REGbundles) of the first control resource set is W, and a bandwidth supported by the first terminal device is less than a bandwidth corresponding to the N resource blocks, and N and W are positive integers;
sending a first control channel on M REGbundles in the W REGbundles, wherein M is less than W, indexes {i, i+1, . . . , i+(Y-1)} of Y REGbundles in the M REGbundles are consecutive, indexes {i+(Y+X), i+(Y+X+1), . . . , i+(M-1+X)} of remaining (M-Y) REGbundles in the M REGbundles are consecutive, M represents a quantity of available REGbundles of the first terminal device, i, Y, and X are values determined by the first terminal device, M and Y are positive integers, and i and X are integers greater than or equal to 0; or
sending the first control channel on M control channel element (CCE) resources corresponding to the M REGbundles in the W REGbundles, wherein M is less than W, indexes of Y CCE resources in the M CCE resources are {C1, C1+2, . . . , C1+(Y-1)×2}, and indexes of remaining (M-Y) CCE resources in the M CCE resources are {C2, C2+2, . . . , C2+(M-Y-1)×2}; or indexes of the M CCE resources in the M CCE resources are {C1, C1+2, . . . , C1+(M-1)×2}; and M represents the quantity of the available REGbundles of the first terminal device, C1, C2, Y, and X are values determined by the first terminal device, M and Y are positive integers, and C1 and C2 are integers greater than or equal to 0.

12. The method according to claim 11, wherein i is determined based on one or more of the bandwidth supported by the first terminal device, a quantity l of symbols comprised in the first control resource set, N, W, a subcarrier spacing, a frequency range, a cell identifier, a radio frame number, a subframe number, and a slot number; and/or
Y is determined based on one or more of the bandwidth supported by the first terminal device, the quantity l of symbols, N, W, the subcarrier spacing, the frequency range, the cell identifier, the radio frame number, the subframe number, and the slot number; and/or
X is determined based on one or more of the bandwidth supported by the first terminal device, the quantity l of symbols, N, W, the subcarrier spacing, the frequency range, the cell identifier, the radio frame number, the subframe number, and the slot number; and/or
C1 is determined based on one or more of the bandwidth supported by the first terminal device, the quantity l of symbols, N, W, the subcarrier spacing, the frequency range, the cell identifier, the radio frame number, the subframe number, and the slot number; and/or
C2 is determined based on one or more of the bandwidth supported by the first terminal device, the quantity l of symbols, N, W, the subcarrier spacing, the frequency range, the cell identifier, the radio frame number, the subframe number, and the slot number.

13. The method according to claim 11, wherein
i={n+Z} mod (W/2), wherein n represents an identifier of a cell in which the first terminal device is located, $Z=W/2-2^{l-u}$, l represents a quantity of symbols comprised in the first control resource set, u is a subcarrier spacing parameter, and mod represents a REM operation; and/or Y=M/2, or Y=$2^{l-u}$, wherein l represents the quantity of symbols comprised in the first control resource set, and u is the subcarrier spacing parameter; and/or X=W/2−$2^{l-u+1}$, wherein l represents the quantity of symbols comprised in the first control resource set, and u is the subcarrier spacing parameter; and/or X=[W/2−$2^{l-u+1}$]/2, wherein l represents the quantity of symbols comprised in the first control resource set, and u is the subcarrier spacing parameter; and/or X=W/2−$2^{l-1}$, wherein l represents the quantity of symbols comprised in the first control resource set, and u is the subcarrier spacing parameter.

14. The method according to claim 11, wherein
C1=2N1+T, wherein N1=W/2−$2^{l-u}$; when a result obtained through n mod W is greater than or equal to $2^{l-u}$ and less than or equal to $2^{l-u}$+W/2−1, T=1; when the result obtained through n mod W is less than $2^{l-u}$ or greater than $2^{l-u}$+W/2−1, T=0, wherein N represents an identifier of a cell in which the first terminal device is located, l represents a quantity of symbols comprised in the first control resource set, u is a subcarrier spacing parameter, and mod represents a REM operation; and/or C2=2N2+1−T, wherein N2=W/2−$2^{l-u+1}$, or N2=(W/2−$2^{l-u+1}$)/2; when the result obtained through n mod W is greater than or equal to $2^{l-u}$ and less than or equal to $2^{l-u}$+W/2−1}, T=1; when the result obtained through n mod W is less than $2^{l-u}$ or greater than $2^{l-u}$+W/2−1, T=0, wherein n represents the identifier of the cell in which the first terminal device is located, l represents the quantity of symbols comprised in the first control resource set, and u is the subcarrier spacing parameter; and/or Y=M/2, or Y=$2^{l-u}$, wherein l represents the quantity of symbols comprised in the first control resource set, and u is the subcarrier spacing parameter.

15. The method according to claim 11, wherein
i=n mod (W/2)+Z, wherein n represents an identifier of a cell in which the first terminal device is located, Z=W/2−$2^{l-u+1}$, or Z=[W/2−$2^{l-u+1}$]/2, wherein l represents a quantity of symbols comprised in the first control resource set, u is a subcarrier spacing parameter, and mod represents a REM operation; and/or Y=M/2, or Y=$2^{l-u}$, wherein l represents the quantity of symbols comprised in the first control resource set, and u is the subcarrier spacing parameter; and/or

X=0.

16. An apparatus, comprising:
one or more processors; and
one or more non-transitory computer readable memories coupled to the one or more processors and storing programming to be executed by the one or more processors, the programming including instructions for:
receiving first information from a network device, wherein the first information is used to indicate a first control resource set, a quantity of resource blocks of the first control resource set is N, a quantity of resource element group bundles (REGbundles) of the first control resource set is W, and a bandwidth supported by a first terminal device is less than a bandwidth corresponding to the N resource blocks, and N and W are positive integers;
monitoring a first control channel on M REGbundles in the W REGbundles, wherein M is less than W, indexes {i, i+1, . . . , i+(Y−1)} of Y REGbundles in the M REGbundles are consecutive, indexes {i+(Y+X), i+(Y+X+1), . . . , i+(M−1+X)} of remaining (M−Y) REGbundles in the M REGbundles are consecutive, M represents a quantity of available REGbundles of the first terminal device, i, Y, and X are values determined by the first terminal device, M and Y are positive integers, and i and X are integers greater than or equal to 0; or monitoring the first control channel on M control channel element (CCE) resources corresponding to the M REGbundles in the W REGbundles, wherein M is less than W, indexes of Y CCE resources in the M CCE resources are {C1, C1+2, . . . , C1+(Y−1)×2}, and indexes of remaining (M−Y) CCE resources in the M CCE resources are {C2, C2+2, . . . , C2+(M−Y−1)×2}; or indexes of the M CCE resources in the M CCE resources are {C1, C1+2, . . . , C1+(M−1)×2}; and M represents the quantity of the available REGbundles of the first terminal device, C1, C2, Y, and X are values determined by the first terminal device, M and Y are positive integers, and C1 and C2 are integers greater than or equal to 0.

17. The apparatus according to claim 16, wherein i is determined based on one or more of the bandwidth supported by the first terminal device, a quantity l of symbols comprised in the first control resource set, N, W, a subcarrier spacing, a frequency range, a cell identifier, a radio frame number, a subframe number, and a slot number; and/or Y is determined based on one or more of the bandwidth supported by the first terminal device, the quantity l of symbols, N, W, the subcarrier spacing, the frequency range, the cell identifier, the radio frame number, the subframe number, and the slot number; and/or X is determined based on one or more of the bandwidth supported by the first terminal device, the quantity l of symbols, N, W, the subcarrier spacing, the frequency range, the cell identifier, the radio frame number, the subframe number, and the slot number; and/or C1 is determined based on one or more of the bandwidth supported by the first terminal device, the quantity l of symbols, N, W, the subcarrier spacing, the frequency range, the cell identifier, the radio frame number, the subframe number, and the slot number; and/or C2 is determined based on one or more of the bandwidth supported by the first terminal device, the quantity l of symbols, N, W, the subcarrier spacing, the frequency range, the cell identifier, the radio frame number, the subframe number, and the slot number.

18. The apparatus according to claim 16, wherein
i={n+Z} mod (W/2), wherein n represents an identifier of a cell in which the first terminal device is located, Z=W/2−$2^{l-u}$, l represents a quantity of symbols comprised in the first control resource set, u is a subcarrier spacing parameter, and mod represents a REM operation; and/or Y=M/2, or Y=$2^{l-u}$, wherein l represents the quantity of symbols comprised in the first control resource set, and u is the subcarrier spacing parameter; and/or X=W/2−$2^{l-u+1}$, wherein l represents the quantity of symbols comprised in the first control resource set, and u is the subcarrier spacing parameter; and/or X=[W/2−$2^{l-u+1}$]/2, wherein l represents the quantity of symbols comprised in the first control resource set, and u is the subcarrier spacing parameter; and/or X=W/2−$2^{l-1}$, wherein l represents the quantity of symbols comprised in the first control resource set, and u is the subcarrier spacing parameter.

19. The apparatus according to claim 16, wherein

C1=2N1+T, wherein N1=W/2−$2^{l-u}$; when a result obtained throu gh n mod W is greater than or equal to $2^{l-u}$ and less than or equal to $2^{l-u}$+W/2−1, T=1; when the result obtained through n mod W is less than $2^{l-u}$ or greater than $2^{l-u}$+W/2−1, T=0, wherein N represents an identifier of a cell in which the first terminal device is located, l represents a quantity of symbols comprised in the first control resource set, u is a subcarrier spacing parameter, and mod represents a REM operation; and/or C2=2N2+1-T, wherein N2=W/2−$2^{l-u+1}$, or N2=(W/2−$2^{l-u+1}$/2; when the result obtained through n mod W is greater than or equal to $2^{l-u}$ and less than or equal to $2^{l-u}$+W/2−1}, T=1; when the result obtained through n mod W is less than $2^{l-u}$ or greater than $2^{l-u}$+W/2−1, T=0, wherein n represents the identifier of the cell in which the first terminal device is located, l represents the quantity of symbols comprised in the first control resource set, and u is the subcarrier spacing parameter; and/or Y=M/2, or Y=$2^{l-u}$, wherein l represents the quantity of symbols comprised in the first control resource set, and u is the subcarrier spacing parameter.

20. The apparatus according to claim 16, wherein i=n mod (W/2)+Z, wherein n represents an identifier of a cell in which the first terminal device is located, Z=W/2−$2^{l-u+1}$, or Z=[W/2−$2^{l-u+1}$]/2, wherein l represents a quantity of symbols comprised in the first control resource set, u is a subcarrier spacing parameter, and mod represents a REM operation; and/or Y=M/2, or Y=$2^{l-u}$, wherein l represents the quantity of symbols comprised in the first control resource set, and u is the subcarrier spacing parameter; and/or

X=0.

* * * * *